US011842315B2

(12) United States Patent
Gariepy et al.

(10) Patent No.: US 11,842,315 B2
(45) Date of Patent: Dec. 12, 2023

(54) SYSTEMS AND METHODS FOR AUTONOMOUS LINESIDE PARTS DELIVERY TO AN ASSEMBLY LINE PROCESS

(71) Applicant: CLEARPATH ROBOTICS INC., Kitchener (CA)

(72) Inventors: Ryan Christopher Gariepy, Kitchener (CA); Simon Drexler, Puslinch (CA); Roydyn Clayton, Seattle, WA (US); Sam Adrian Jenkins, Waterloo (CA); Pavel Bovbel, Kitchener (CA); Yvan Geoffrey Rodrigues, Guelph (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 128 days.

(21) Appl. No.: 17/212,922

(22) Filed: Mar. 25, 2021

(65) Prior Publication Data

US 2021/0279670 A1  Sep. 9, 2021

Related U.S. Application Data

(63) Continuation of application No. 15/936,977, filed on Mar. 27, 2018, now Pat. No. 10,990,919.

(Continued)

(51) Int. Cl.
*G06Q 10/00* (2023.01)
*G06Q 10/083* (2023.01)
*G06Q 10/0631* (2023.01)

(52) U.S. Cl.
CPC ..... *G06Q 10/083* (2013.01); *G06Q 10/06313* (2013.01)

(58) Field of Classification Search
CPC .............................. G06Q 10/00; G06Q 50/00
(Continued)

(56) References Cited

U.S. PATENT DOCUMENTS 3,968,559 A  7/1976 Karlsson
5,091,855 A  2/1992 Umehara et al.
(Continued)

FOREIGN PATENT DOCUMENTS

DE  102009024195 A1  12/2010
DE  102010030764 A1  1/2012
(Continued)

OTHER PUBLICATIONS

Boca et al.;Ultra-Flexible Production Systems for Automated Factories; 2016 IEEE International Conference on Automation Science and Engineering (CASE) Fort Worth, TX, USA, Aug. 21-24, 2016; pp. 614-619 (Year: 2016).

(Continued)

*Primary Examiner* — Mustafa Iqbal

(57) ABSTRACT

Systems and methods for autonomous lineside delivery to an assembly-line using a self-driving vehicle are disclosed, comprising receiving a part-supply schedule having a part identifier identifying a part to be supplied, an assembly-line location to be supplied with the part, and a delivery time for supplying the part to the assembly-line location. A mission is generated based on the schedule, and sent to a self-driving vehicle. The self-driving vehicle executes the mission such that the part is supplied to the assembly-line location in accordance with the part-supply schedule.

20 Claims, 10 Drawing Sheets

Related U.S. Application Data

(60) Provisional application No. 62/477,047, filed on Mar. 27, 2017.

(58) Field of Classification Search
USPC .......................................................... 705/7.23
See application file for complete search history.

(56) References Cited

U.S. PATENT DOCUMENTS

| | | | |
|---|---|---|---|
| 6,505,093 | B1 | 1/2003 | Thatcher et al. |
| 7,894,933 | B2 | 2/2011 | Mountz et al. |
| 7,931,197 | B2 | 4/2011 | Brandt et al. |
| 7,991,505 | B2 | 8/2011 | Lert, Jr. et al. |
| 8,010,220 | B1 * | 8/2011 | Ames .................. G06Q 10/06 414/467 |
| 8,311,905 | B1 | 11/2012 | Campbell et al. |
| 8,666,546 | B2 | 3/2014 | Sarh et al. |
| 9,014,902 | B1 | 4/2015 | Murphy |
| 9,486,917 | B2 | 11/2016 | Reid et al. |
| 9,733,646 | B1 * | 8/2017 | Nusser .................. B65G 1/137 |
| 10,304,027 | B1 | 5/2019 | Haque |
| 11,468,400 | B1 | 10/2022 | Kumar et al. |
| 2003/0105552 | A1 | 6/2003 | Lunak et al. |
| 2006/0074778 | A1 | 4/2006 | Katou et al. |
| 2011/0282476 | A1 | 11/2011 | Hegemier et al. |
| 2012/0101627 | A1 | 4/2012 | Lert |
| 2014/0074287 | A1 | 3/2014 | LaFary et al. |
| 2014/0100769 | A1 | 4/2014 | Wurman et al. |
| 2014/0172223 | A1 | 6/2014 | Murphy |
| 2014/0365258 | A1 | 12/2014 | Vestal et al. |
| 2015/0314890 | A1 | 11/2015 | DesJardien et al. |
| 2016/0011593 | A1 | 1/2016 | Oberoi et al. |
| 2016/0101940 | A1 | 4/2016 | Grinnell et al. |
| 2016/0124434 | A1 | 5/2016 | Gariepy et al. |
| 2017/0236082 | A1 | 8/2017 | Davidson et al. |
| 2017/0330138 | A1 | 11/2017 | Stoeckel et al. |
| 2018/0029178 | A1 | 2/2018 | Thorwarth |
| 2018/0150794 | A1 * | 5/2018 | Ho .................. G06Q 10/08355 |
| 2019/0179329 | A1 | 6/2019 | Keivan et al. |
| 2019/0250641 | A1 | 8/2019 | Beer et al. |
| 2020/0130115 | A1 | 4/2020 | Vetter et al. |
| 2021/0385012 | A1 | 12/2021 | Liu et al. |

FOREIGN PATENT DOCUMENTS

| | | |
|---|---|---|
| WO | WO0125796 A1 | 4/2001 |
| WO | 2011093813 A1 | 8/2011 |
| WO | 2016012742 A1 | 1/2016 |

OTHER PUBLICATIONS

International Search Report and Written Opinion dated Jul. 18, 2018 in related International Patent Application No. PCT/IB2018/052101 (8 pages).

Milberg et al.; Integration of Autonomous Mobile Robots into the Industrial Production Environment, Proc. 1987 IEEE Intl. Conf. on Robotics and Automation; Raleigh, NC; 1987; pp. 1953-1959 (Year: 1987).

* cited by examiner

SYSTEMS AND METHODS FOR AUTONOMOUS LINESIDE PARTS DELIVERY TO AN ASSEMBLY LINE PROCESS

CROSS-REFERENCE TO RELATED APPLICATIONS

This application is a continuation of U.S. patent application Ser. No. 15/936,977, filed Mar. 27, 2018 which claims priority from U.S. Provisional Patent Application No. 62/477,047, filed Mar. 27, 2017, the contents of which are incorporated herein by reference.

FIELD

The described embodiments relate to parts delivery in industrial manufacturing, and in particular, to systems and methods for autonomous lineside delivery.

BACKGROUND

Industrial manufacturing processes rely on the lineside delivery of parts to a manufacturing process. For example, an assembly line whose product is a finished good uses individual parts that are assembled into the finished good. The parts are taken from a storage location, provided to the assembly line at a location and place, and are then used in the assembly of the finished good.

The process by which parts are delivered to the assembly line can have a significant impact on the overall efficiency and productivity of the manufacturing process. In light of this impact, various processes may be used. In some processes, the parts may be stored in a storage location away from the assembly line, and then brought a location along the assembly line so that the parts may be readily available to the assembly line. In order to make efficient use of the space in an industrial facility, it is prudent to deliver a relatively small number of parts to the assembly line, and to store larger number of parts in an inventory location away from the assembly line. Since a relatively small number of parts are delivered to the assembly line during any particular delivery, it is important that deliveries are made on time (e.g. "just-in-time", prior to the parts being needed) so that the late delivery of parts does not cause delays in the assembly line process.

In view of the above, the overall efficiency and productivity of a manufacturing process can be improved by a combination reducing uncertainties in the delivery of parts to a particular queue, as well as by allocating the delivery process resources across multiple queues.

SUMMARY

In one aspect, there is provide a method for lineside parts delivery to an assembly-line process. A part-supply schedule is received that comprises a part identifier identifying a part to be supplied, an assembly-line location to be supplied with the part, and a delivery time for supplying the part to the assembly-line location. A mission is generated based on the schedule. The mission is received with a processor on a self-driving material-transport vehicle, and the vehicle executes the mission so that the part is supplied to the assembly-line location at the delivery time in accordance with the part-supply schedule.

According to one embodiment, the part-supply schedule is determined based on a takt time of the assembly-line process.

According to one embodiment, the at least one mission is generated with a fleet-management system, and the at least one mission is received from the fleet-management system.

According to one embodiments, the fleet-management system is sued to select the self-driving material transport vehicle for executing the mission from a among a fleet of self-driving material-transport vehicles.

According to some embodiments, the part-supply schedule is received from an enterprise resource planning system.

According to some embodiments, there is a first assembly-line location and a second assembly-line location, a first part identifier for identifying a first part to be supplied to the first assembly-line location, and a second part identifier for identifying a second part to be supplied to the second assembly-line location. There is a first delivery time for supplying the first part to the first assembly-line location, and a second delivery time for supplying the second part to the second assembly-line location. The second delivery time is determined based on the first delivery time and the takt time.

According to some embodiments, the first mission is generated for delivering the first part to the first assembly-line location, and a second mission is generated for delivering the second mission to the second assembly-line location. A first vehicle is selected for executing the first mission, and a second vehicle is selected for executing the second mission.

According to some embodiments, there is a one assembly-line location, a first part identifier for identifying a first part to be supplied, and a second part identifier for identifying a second part to be supplied to the assembly-line location. Accordingly, there is a first delivery time and a second delivery time. A first mission and a second mission are generated accordingly. According to some embodiments, a first vehicle is selected for executing the first mission, and a second vehicle is selected for executing the second mission.

According to some embodiments, executing at least one mission comprises delivering a second part to a waypoint with a second vehicle, and delivering a first part to a first assembly-line location with a first vehicle, and subsequently delivering the second part from the waypoint to the first assembly-line location at the second delivery time with the second vehicle.

According to some embodiments, generating the mission comprises determining a pick-up time based on the delivery time and the assembly-line location.

According to some embodiments, determining the pick-up time is based on at least one traffic condition.

According to some embodiments, generating the mission further comprises determining a departure time based on the pick-up time and the at least one part identifier.

According to some embodiments, executing the mission comprises orienting the vehicle at a pick-up location such that the at least one part can be received on the vehicle.

According to some embodiments, orienting the vehicle comprises determining an orientation based on an apparatus on the vehicle.

According to some embodiments, orienting the vehicle comprises determining an orientation based on equipment at the pick-up location for loading the at least one part on the vehicle.

According to some embodiments, executing the mission comprises loading a part on a vehicle using an apparatus on the at least one vehicle.

According to some embodiments, executing the mission comprises unloading a part at the assembly-line location using an apparatus on the vehicle.

In one aspect, there is provided a system for lineside parts delivery to an assembly-line process. The system comprises a fleet-management system having a processor, and at least one self-driving vehicle having a processor. The processor of the fleet-management system is configured to receive a parts-supply schedule comprising a part identifying a part to be supplied to an assembly-line location, generate a mission based on based on the schedule, and select a self-driving materiel transport vehicle for executing the mission. The processor of the vehicle is configured to receive the mission from the fleet-management system and execute the mission such that the part is supplied to the assembly-line location.

In one aspect, there is provided a method for lineside parts delivery to an assembly-line process. A pick-up location is determined with a self-driving material=transport vehicle. The vehicle travels to the pick-up location and scans an identification tag associated with a part at the pick-up location, in order to obtain additional information. The part is received on the vehicle. An assembly-line location is determined based on the additional information, and the vehicle travels to the assembly-line location. The additional information is indicative of a delivery time for the part at the assembly-line location.

In one aspect, there is provided a method for lineside parts delivery. A first assembly line is implemented having a first assembly-line layout. A self-driving vehicle system is used in coordination with the first assembly-line layout. The, the first assembly line is replaced with a second assembly line having a second assembly-line layout, and the self-driving vehicle system is used in coordination with the second assembly-line layout. The self-driving vehicle system has at least one self-driving vehicle capable of autonomously navigating the first assembly-line layout and the second assembly-line layout without any changes to the self-driving vehicle system.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
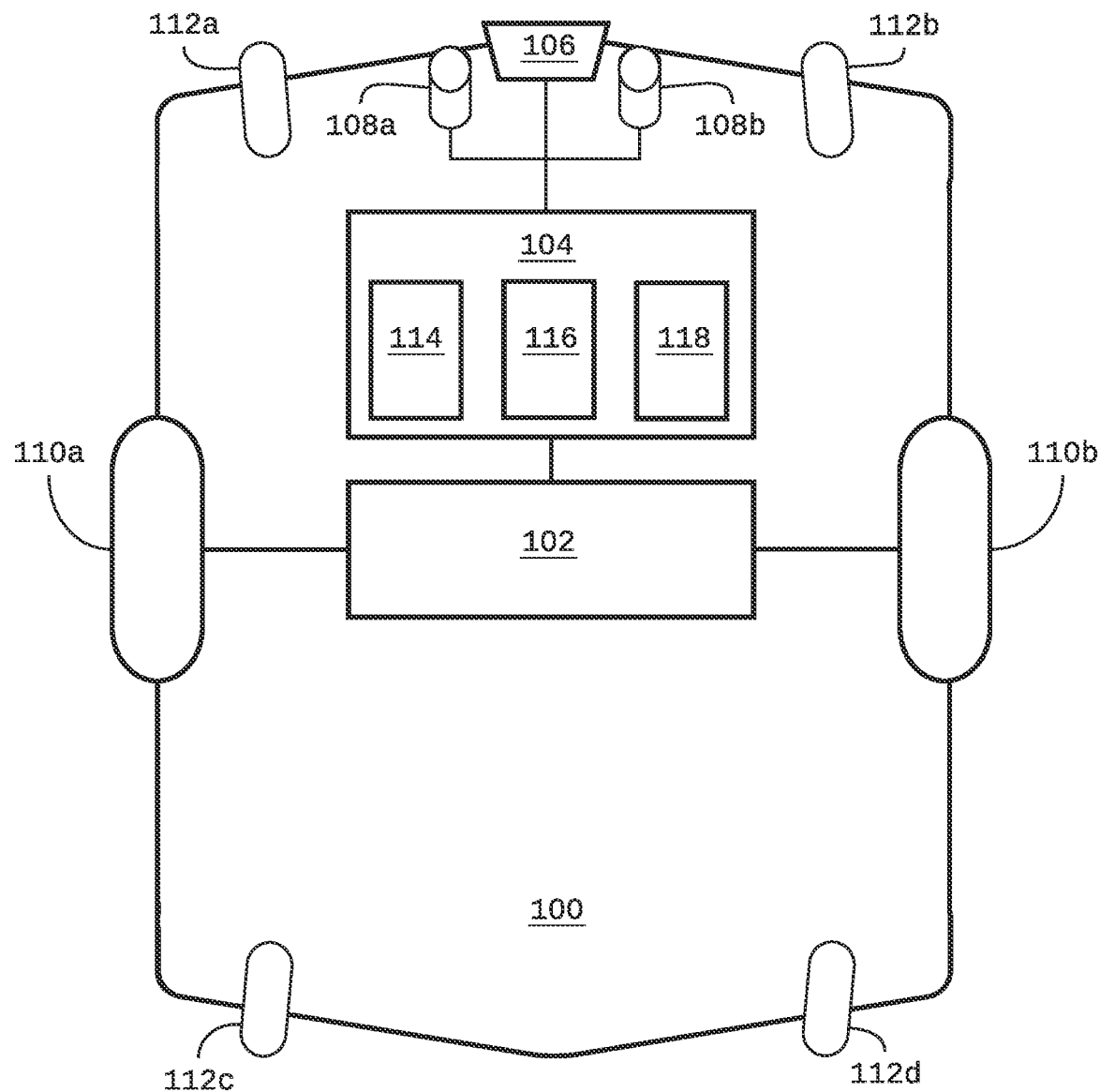
FIG. 1 is a system diagram of a self-driving material-transport vehicle, according to some embodiments.

Referring to FIG. 1, there is shown a self-driving material-transport vehicle 100 according to some embodiments. The vehicle comprises a drive system 102, a control system 104, and one or more sensors 106, 108a, and 108b.

The drive system 102 includes a motor and/or brakes connected to drive wheels 110a and 110b for driving the vehicle 100. According to some embodiments, the motor may be an electric motor, combustion engine, or a combination/hybrid thereof. Depending on the particular embodiment, the drive system 102 may also include control interfaces that can be used for controlling the drive system 102. For example, the drive system 102 may be controlled to drive the drive wheel 110a at a different speed than the drive wheel 110b in order to turn the vehicle 100. Different embodiments may use different numbers of drive wheels, such as two, three, four, etc.

According to some embodiments, additional wheels 112 may be included (as shown in FIG. 1, the wheels 112a, 112b, 112c, and 112d may be collectively referred to as the wheels 112). Any or all of the additional wheels 112 may be wheels that are capable of allowing the vehicle 100 to turn, such as castors, omni-directional wheels, and mecanum wheels.

The control system 104 comprises a processor 114, a memory 116, and a computer-readable non-transitory medium 118. According to some embodiments, the control system 104 may also include a communications transceiver (not shown in FIG. 1), such as a wireless transceiver for communicating with a wireless communications network (e.g. using an IEEE 802.11 protocol or similar).

One or more sensors 106, 108a, and 108b may be included in the vehicle 100. For example, according to some embodiments, the sensor 106 may be a LiDAR device (or other optical/laser, sonar, or radar range-finding sensor). The sensors 108a and 108b may be optical sensors, such as video cameras. According to some embodiments, the sensors 108a and 108b may be optical sensors arranged as a pair in order to provide three-dimensional (e.g. binocular or RGB-D) imaging.

The control system 104 uses the medium 118 to store computer programs that are executable by the processor 114 (e.g. using the memory 116) so that the control system 104 can provide automated or autonomous operation to the vehicle 100. Furthermore, the control system 104 may also store an electronic map that represents the known environment of the vehicle 100, such as a manufacturing facility, in the media 118.

For example, the control system 104 may plan a path for the vehicle 100 based on a known destination location and the known location of the vehicle. Based on the planned path, the control system 104 may control the drive system 102 in order to drive the vehicle 100 along the planned path. As the vehicle 100 is driven along the planned path, the sensors 106, and/or 108a and 108b may update the control system 104 with new images of the vehicle's environment, thereby tracking the vehicle's progress along the planned path and updating the vehicle's location.

Since the control system 104 receives updated images of the vehicle's environment, and since the control system 104 is able to autonomously plan the vehicle's path and control the drive system 102, the control system 104 is able to determine when there is an obstacle in the vehicle's path, plan a new path around the obstacle, and then drive the vehicle 100 around the obstacle according to the new path.

According to some embodiments, the vehicle 100 may receive a mission from a fleet-management system or other external computer system in communication with the vehicle 100 (e.g. in communication via the transceiver in the control system 104). In this case, the mission contains one or more waypoints or destination locations. Based on the waypoint or destination location contained in the mission, the vehicle 100, based on the control system 104, can autonomously navigate to the waypoint or destination location without receiving any other instructions from an external system. For example, the control system 104, along with the sensors 106, and/or 108a, and 108b, enable the vehicle 100 to navigate without any additional navigational aids such as navigational targets, magnetic strips, or paint/tape traces installed in the environment in order to guide the vehicle 100.

Figure 2:
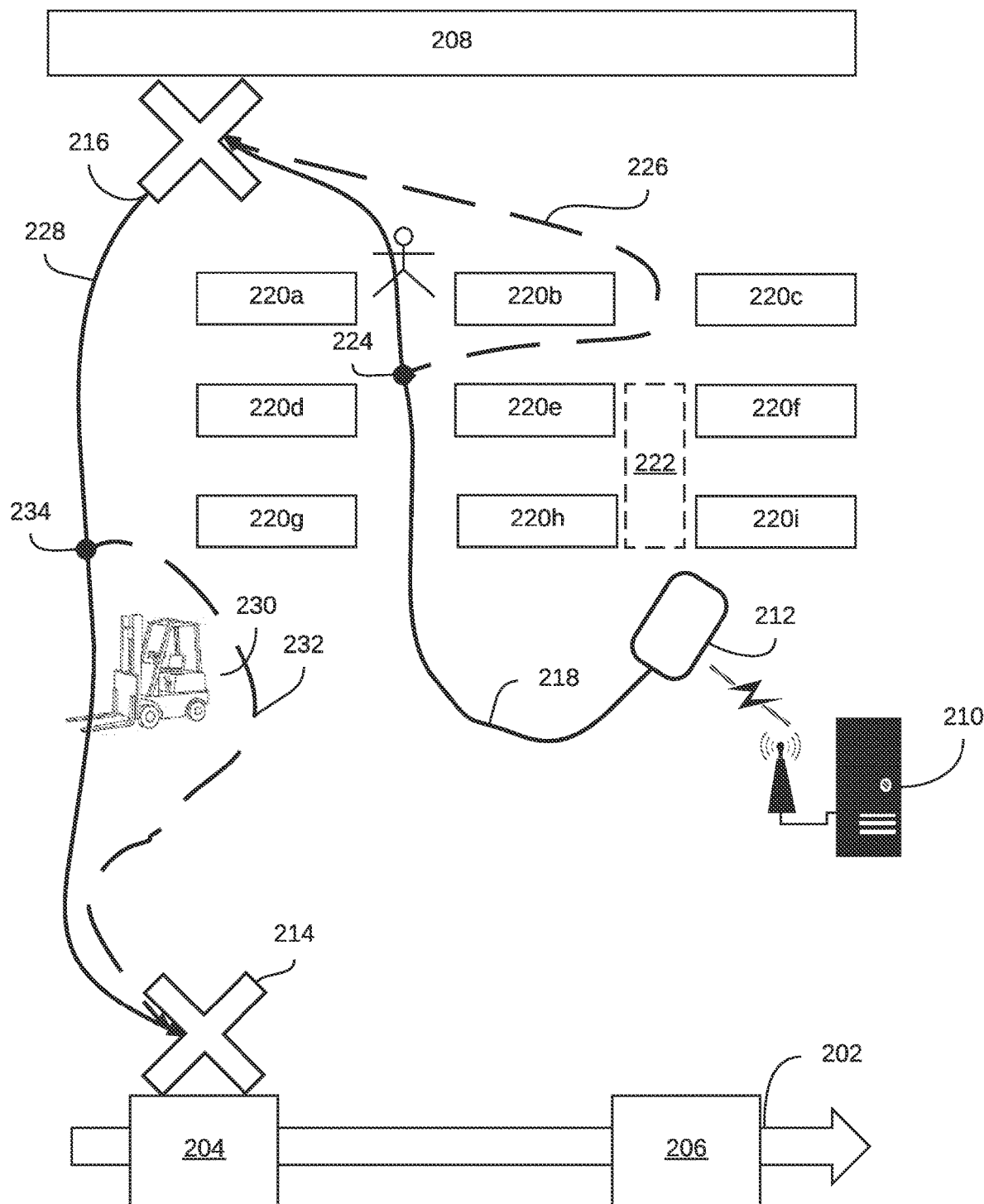
FIG. 2 is a plan view of a system for autonomous lineside delivery in a manufacturing facility according to some embodiments.

Referring to FIG. 2, there is shown a manufacturing facility 200 in which an assembly line 202 is operating. The assembly line 202 is run in an attempt to achieve a "lean" or "just-in-time" process, by implementing autonomous line-side delivery. The assembly line 202 is shown with an arrow to indicate that the assembly line progresses to the right as shown in FIG. 2. Two example stages are shown in the assembly line 202: a first stage 204, and a second stage 206. Each stage represents a time within the manufacturing process and/or a place within the assembly line 202 at which a unique operation is performed in the manufacturing process. For example, if the assembly line 202 is an automobile assembly line, then the stage 204 may involve installing the dashboard of an automobile being assembled, and the stage 206 may involve installing the windshield.

For example, a first vehicle may pass through the stage 204 for dashboard installation. Subsequently, the first vehicle may pass through the stage 206 for windshield installation, while, simultaneously, a second vehicle is passing through the stage 204 for dashboard installation.

According to some embodiments, the operation of each stage on the assembly line 202 may be conducted according to a "takt time" of the assembly line 202. As used herein, the term "takt time" means the time between the start of production of one unit (e.g. a first automobile, as above) and the start of production of the next unit (e.g. a second automobile, as above). In some cases, the take time may be calculated as an average time across multiple units.

In the above example, the takt time may be one minute. As such, the operation of each stage of the assembly line 202 may be conducted within one minute. Similarly, relative to a single stage (e.g. the stage 204 or the stage 206), a new unit is leaving the stage every minute.

According to some embodiments, the operation of a single stage (e.g. the stage 204 or the stage 206) may require a multiple of the takt time. For example, if the operation at stage 204 required two minutes to complete, then two stages 204 could be operated in parallel so that a unit was being supplied to the subsequent stage 206 every minute.

As shown in FIG. 2, the stage 204 requires that a part be supplied from an inventory shelf 208 that is located remotely from the assembly line 202.

According to some embodiments, the management of inventory and scheduling of parts delivery to the assembly line 202 may be managed by an enterprise resource planning ("ERP") system. For example, the enterprise resource planning system may know that the particular part required for the stage 204 is stored at the shelf 208. According to some embodiments, the enterprise resource planning system may also be aware of (i.e. store in memory) the takt time of the assembly-line process associated with the assembly line 202.

According to some embodiments, a fleet-management system 210 may be used to provide a mission to a self-driving vehicle 212 in accordance with a delivery schedule provided by the enterprise resource planning system. The fleet-management system 210 has a processor, memory, non-transitory computer-readable media, and a transceiver (e.g. a wireless transceiver) for communicating with a communications network. The fleet-management system 210 uses the media to store computer programs that are executable by the processor (e.g. using the memory) so that the fleet-management system 210 can communicate information with other system, and communicate with a self-driving vehicle 212 in order to generate and communicate missions for the vehicle 212. The fleet-management system 210 can communicate with an enterprise resource planning system (if an enterprise resource planning system is being used), and, according to some embodiments, the enterprise resource planning system may operate on the same computer system as the fleet-management system.

Any or all of the vehicles, the fleet-management system 210, and the enterprise resource planning system may communicate using known telecommunications protocols and methods. For example, each vehicle and system may be equipped with a wireless transceiver to enable wireless communications according to a WiFi protocol (e.g. IEEE 802.11 protocols).

According to some embodiments, the fleet-management system 210 may receive a delivery schedule from the enterprise resource planning system. The schedule may include a part identifier for identifying the part that is required by a particular stage in the assembly line 202, and an assembly-line location 214 associated with the stage. In some embodiments, the fleet-management system 210 may receive a part identifier and the corresponding assembly-line location from another source. According to some embodiments, the fleet-management system 210 may also receive a delivery time associated by which a part is required at the corresponding assembly-line location, and, this delivery time can be determined based on a takt time associated with the assembly line 202.

The part identifier generally identifies the part that is required for delivery. According to some embodiments, two different types of parts may be available. The first type of part may be considered a "fungible" type part, meaning that there are multiple parts of the same type that may be substituted with each other in the assembly process. An example of a fungible-type part is a standard-sized bolt used as a fastener. In this case, the part identifier may identify the type of part (e.g. the type of standard-sized bolt) that is required, without identifying a particular part itself (e.g. a particular bolt).

The second type of part may be considered a "unique" type part, meaning that there is only one part of that type that can be used in the assembly process. An example of a unique-type part is an automobile engine that has been assigned a vehicle-identification number (VIN). If an automobile with an assigned VIN is being assembled, then the particular engine with the assigned VIN must be installed in the corresponding automobile. As such, even though there may be seemingly fungible engines available (e.g. more than one engine with the same technical specifications), one engine cannot be substituted for another engine, since each engine has been assigned a unique VIN. In this case, the part identifier may be a unique identifier for a particular part, such as a serial number or inventory number (e.g. or a VIN, as in the above example).

According to some embodiments, the part identifier may be a storage location. For example, if there is a one-to-one correspondence between a storage location and multiple fungible parts, or between a storage location and a single unique part, then the part identifier may identify the corresponding storage location.

Based on the delivery schedule, the fleet-management system 210 determines a pick-up location 216 (shown with a large "X" as if on a map of the facility 200) where a part corresponding to the part identifier are available for pick up. According to some embodiments, the pick-up location 216 may be adjacent a shelf 208 where the parts are stored in inventory. According to some embodiments, the pick-up location 216 may be located at a delivery dock (not shown) such that parts can be made available directly from a delivery truck (i.e. making deliveries from a source external to the facility 200). According to some embodiments, the pick-up location 216 may be located at a piece of equipment used to automatically load the part onto the vehicle. According to some embodiments, the pick-up location 210 may be determined in association with the part identifier, for example, in a database or look-up table, which may be provided, for example, by an enterprise resource planning system.

The pick-up location 216 may be determined relative to various reference points. For example, the pick-up location 216 may simply be the location of the shelf 208 or delivery-truck dock (and, for example, if the part identifier is the location of the part, as previously described, then the pick-up location 216 may be directly obtained from the part identifier). In another example, the pick-up location 216 may be placed adjacent to the shelf 208 (or a delivery-truck dock) so that the part(s) can be loaded onto the vehicle 212 from the shelf 208 (or delivery truck, etc.) by a human operator, a gantry, or other loading/unloading equipment.

According to some embodiments, the pick-up location 216 may not be known to the fleet-management system 210 until right before the fleet-management system 210 generates a mission. For example, if the part associated with the mission is being made available directly from a delivery truck at a delivery-truck dock, then the particular dock can be assigned to the delivery truck at any time up to the point that the mission is generated. As such, by using the autonomous lineside delivery described herein, greater flexibility can be obtained for delivery trucks that are supplying parts to the facility 200, since autonomous lineside delivery is capable of dynamically picking up any part from any delivery-truck dock.

Similarly, if the part is stored in inventory on the shelf 208, then the particular location on the shelf 208 (i.e. the particular pick-up location 216) may not be known to the fleet-management system 210 until right before the fleet-management system 210 generates the mission. For example, if the parts associated with the mission are unique-type parts (e.g. engines with unique VINs being assembled into automobiles), then the particular spot on the shelf 208 can be assigned to the particular part at any time up to the point that the mission is generated. As such, by using the autonomous lineside delivery described herein, greater flexibility can be obtained for inventory areas where parts are stored, since autonomous lineside delivery is capable of dynamically picking up any part from any shelf or location along a shelf.

According to some embodiments, the mission generated by the fleet-management system 210 may include any or all of the part identifier, pickup-up location 216, and assembly-line location 214 (shown with a large "X" as if on a map of the facility 200). As depicted in FIG. 2, the assembly-line location 214 is adjacent the assembly-line stage 204.

According to some embodiments, the assembly-line location 214 may be the same as the location of the assembly-line stage 204. For example, the vehicle 212 itself may serve as a platform for the assembly-line stage 204 such that parts can be moved directly from the vehicle 212 to be used on the assembly line 202.

In some cases, the mission may simply consist of a part identifier and a pick-up location 216. In this case, a vehicle 212 may be responsible for locating the particular part within the vicinity of the pick-up location based on the part identifier, for example, by entering a "part-search" mode. When the vehicle 212 is in part-search mode, it travels within a pre-defined proximity of the pick-up location 216 and searches for the part based on the part identifier. For example, the vehicle 212 may use sensors to scan objects such as identification tags such as RFID tags, bar codes, QR codes, etc. that are attached to (or associated with) particular storage locations or parts. According to some embodiments, the vehicle may use its optical sensors to capture an image of an object, compare the image to a known image of the part associated with the part identifier, and store the resulting information as the identification tag. According to other embodiments, a human operator may use a bar code scanner attached to the vehicle 212 to scan an object as it is placed on the vehicle 212. When the vehicle 212 matches a scanned object with the part identifier, the vehicle 212 has effectively located the part to be received on the vehicle 212.

According to some embodiments, the vehicle 212 may obtain additional information from an identification tag. For example, any or all of an assembly-line location, a delivery time, a parts sequence, or an additional part identifier may be obtained. The additional information obtained from the identification tag may be transmitted to the fleet-management system 210 and/or stored on the vehicle 212 so that the fleet-management system 210 and/or the vehicle 212 can append the current mission with new tasks which are in part governed by the additional information, generate a new mission for the vehicle 212 based on the additional information, or associate the additional information with the process taking place at stage 204 upon the arrival of vehicle 212.

Additional part identifiers may be used, for example, where the (original) part identifier received in the mission pertains to a type of part (or a fungible part), and the additional part identifier pertains to a unique part within the type of part (or fungible parts). For example, a mission may be generated in which the vehicle 212 is sent to a pick-up location 216 in order to pick up an engine. In this case, the part identifier pertains to a generic engine. When the vehicle arrives at the pick-up location 216, it scans the surrounding area for an identification tag associated with an "engine". Once it finds the engine, the vehicle 212 obtains additional information from the identification tag, which includes a VIN for the particular engine (i.e. an additional part identifier). Based on the particular part identifier, the vehicle 212 is able to determine (e.g. directly, or via the fleet-management system, with or with an enterprise resource planning system) that the particular engine is to be delivered to a particular stage of the assembly line process within a particular sequence of other engines and/or at a particular time.

The vehicle 212 may be located anywhere within the facility 200 when it receives a mission from the fleet-management system 210. As depicted in FIG. 2, the vehicle 212 has received a mission from the fleet-management system 210, which includes instructions to travel to the pick-up location 216 in order to pick up a part from the shelf 208, and drop off the part at the assembly-line location 204.

In order to travel to the pick-up location 216, the vehicle 212 uses a map of the facility 200 stored on the control system of the vehicle 212. Based on the map, the control system of the vehicle 212 plans a pick-up path 218 (indicated by the solid line from the location of the vehicle 212 to the pick-up location 216).

The pick-up path 218 initially planned by the vehicle 212 includes routing for a preferred path through shelving units 220a through 220i (collectively "the shelving units 220), as well as an identified zone 222 According to some embodiments, the zone 222 may be stored as a part of the map in the control system of the vehicle 212. According to some embodiments, the location of the zone 222 may be provided to the vehicle 222 by the fleet-management system 210, for example, as a part of a periodic update.

The identified zone 222 may indicate an area within the facility 200 that requires special navigational consideration by the vehicle 212. Generally, these considerations can be referred to as "traffic conditions" For example, the zone 222 may indicate that the vehicle 222 cannot pass through the zone 222, because the zone 222 is closed or blocked for traffic. The zone may also indicate that the vehicle 222 can pass through the zone, but at a reduced speed. The zone 222 may be identified on a temporary and/or periodic basis. For example, if there is known vehicle congestion in an area of the facility 222, then the area may be identified as a zone, and then the identified zone may be altered or removed when the congestion has dissipated. Furthermore, zones may be identified according to a schedule, such as, when a particular zone is used for human traffic during the human workers' shift change, or when there is a scheduled delivery of inventory being unloaded in a particular area.

Generally, the path 218 represents the optimized path planned from the location of the vehicle 212 when the mission is received from the fleet-management system 210, to the pick-up location 216. In execution of the mission, the vehicle 212 begins to travel along the pick-up path 216 towards the pick-up location 216.

In the example provided in FIG. 2, as the vehicle 212 travels along the pick-up path 218, a human being walks between the shelf 220a and the shelf 220b, thereby obstructing the pick-up path 218. The vehicle 212, using its sensors, detects the human ("obstruction") when the vehicle is at the location 224. Upon detecting the obstruction, the control system of the vehicle 212 plans an updated pick-up path 226 (shown as a dashed line) in order to route the vehicle 212 from the location 224 to the pick-up location 216, around the obstruction.

When the vehicle 212 arrives at the pick-up location 216, it receives a part, for example, that was stored in inventory on the shelf 208. The control system of the vehicle 212 plans a drop-off path 228 from the location of the vehicle 212 (at or near the pick-up location 216) to the assembly-line location 214.

In the example shown in FIG. 2, as the vehicle 212 travels towards the assembly-line location 214 a forklift 230 ("obstruction") crosses the path of the vehicle 212. In response to the obstruction, the control system of the vehicle 212 plans an updated drop-off path 232 from the location 234 to the assembly-line location 214.

Figure 3:
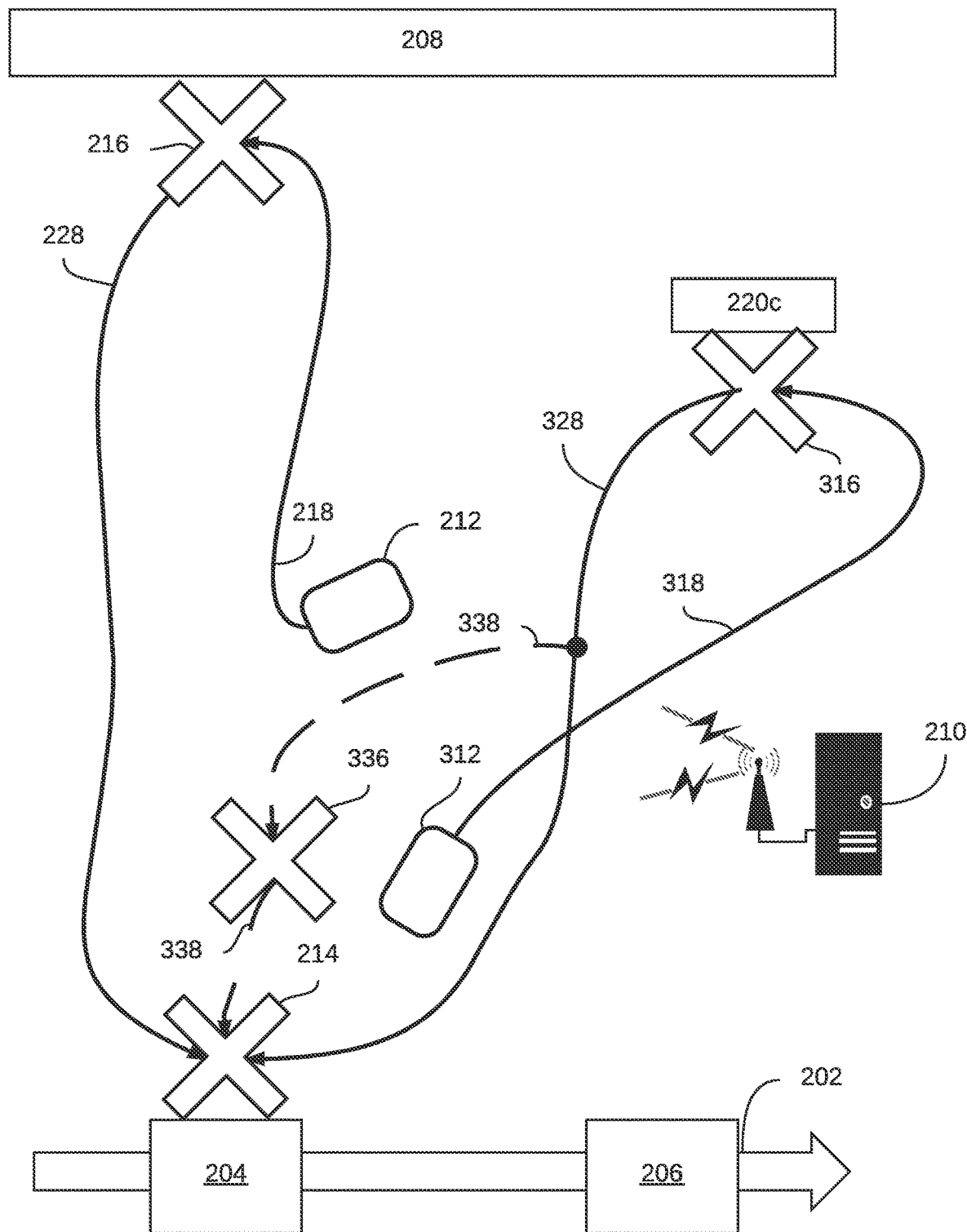
FIG. 3 is a plan view of a system for autonomous lineside delivery in a manufacturing facility according to some embodiments.

Referring to FIG. 3, there is shown the facility 200 according to some embodiments. The facility 200 is the same as shown in FIG. 2, except that certain items (e.g. shelving units 220, except of the shelf 220c) have been removed for simplicity of explanation. In addition to what is shown in FIG. 2, FIG. 3 includes a second self-driving material-delivery vehicle 312. FIG. 3 generally depicts an example of two different vehicles each being used to deliver a part to one assembly-line location. According to some embodiments, any number of vehicles may be used to deliver nay number of parts to an assembly-line location.

As previously described, the vehicle 212 receives a mission from the fleet-management system 210. According to the mission, the vehicle 212 travels along a pick-up path 218 to the pick-up location 216, receives a part from the inventory shelf 208, and travels along a drop-off path 228 to an assembly-line location 214.

At a time that may be before or after the vehicle 212 has started to travel along the pick-up path 218, the fleet-management system 210 generates a new mission, and the vehicle 312 receives the new mission from the fleet-management system 210. According to this new mission, the vehicle 312 plans a pick-up path 318 based on the location of the vehicle 312 (e.g. anywhere within the facility 200) and a pick-up location 316. The vehicle 312 follows the pick-up path 318 to the pick-up location 316, and receives a part or parts. The pick-up location 316 may be anywhere within the facility 200, such as along the shelf 208, or at a delivery-truck dock (not shown).

Once the part has been received by the vehicle 312 at the pick-up location 316, the vehicle 312 plans a drop-off path 328 from the location of the vehicle 312 (at or around the pick-up location 316) to the assembly-line location 214. However, in the example depicted, the fleet-management system 210 and/or the vehicle 312 has estimated that the vehicle 312 will arrive at the assembly-line location 214 before the vehicle 212 arrives at the assembly-line location 214. According to some embodiments, this estimation may be made at any time. In the example shown, the point 338 on the drop-off path 328 is used to indicate the location of the vehicle 312 when it is determined that the vehicle 312 will arrive ahead of the vehicle 212.

Since, in the example provided, the delivery schedule determines that the part carried by the vehicle 212 should be delivered before the part carried by the vehicle 312, the vehicle 312 is rerouted to a waypoint 336. In order travel to the waypoint 336, the vehicle 312 plans an updated drop-off path 338. The vehicle 312 then proceeds to the waypoint 336 until after the vehicle 212 has delivered its part to the assembly-line location 214. The vehicle waits at the waypoint (e.g. for a period based on the takt time) and then proceeds to deliver its part to the assembly-line location.

In this way, autonomous lineside delivery can be used to provide more than one type of part to a particular stage 204 of the assembly line 202 using a first vehicle 212 and a second vehicle 312, without any limitations of assigning a particular vehicle to a particular pick-up location. For example, in an automobile assembly line, the stage 204 may be the stage where brakes are installed. One type of brakes (e.g. "standard" brakes) may be stored on the shelf 208, and another type of brakes (e.g. "performance" brakes) may be stored on the shelf 220c. Thus, the fleet-management system 210 can be used (e.g. along with an enterprise resource planning system or other system) to provide the proper sequence of parts that are needed to produce the required sequence of finished goods. In the above example, a first automobile may be assembled according to an order for an automobile with "standard" brakes, and a second automobile may be assembled according to an order for an automobile with "performance" brakes. Furthermore, the storage location for the "standard" brakes and/or the "performance" brakes could be changed at any given time in order to optimize the overall inventory storage strategy (or, as previously described, in order to increase the flexibility available for assigning delivery trucks to delivery-truck docks).

This is not possible, for example, using an automated guided vehicle ("AGV") that requires specific infrastructure such as a magnetic strip to be pre-determined between particular pick-up and drop-off locations, since the infrastructure must be pre-determined to connect a specific pick-up location with a specific drop-off location, and vehicle cannot deviate from the pre-determined path. Similarly, this is not possible with vehicles driven by human operators, since a particular manufacturing facility and/or inventory area may be too large for a human operator to sufficiently learn the location of every pick-up location and drop-off location in order to be efficient in delivering parts to intermediate stocking queues in a "just-in-time" manner, or to keep up-to-date with changes in pick-up locations.

Other embodiments are similarly contemplated in which two different vehicles may deliver the same type of parts from one pick-up location 216 to one assembly-line location 214 over time. For example, if a new mission is generated by the fleet-management system 210 while the vehicle 212 is travelling along the pick-up path 218 towards the pick-up location 216, the fleet-management system 210 may select the vehicle 312 shown in order to execute the new mission.

Figure 4:
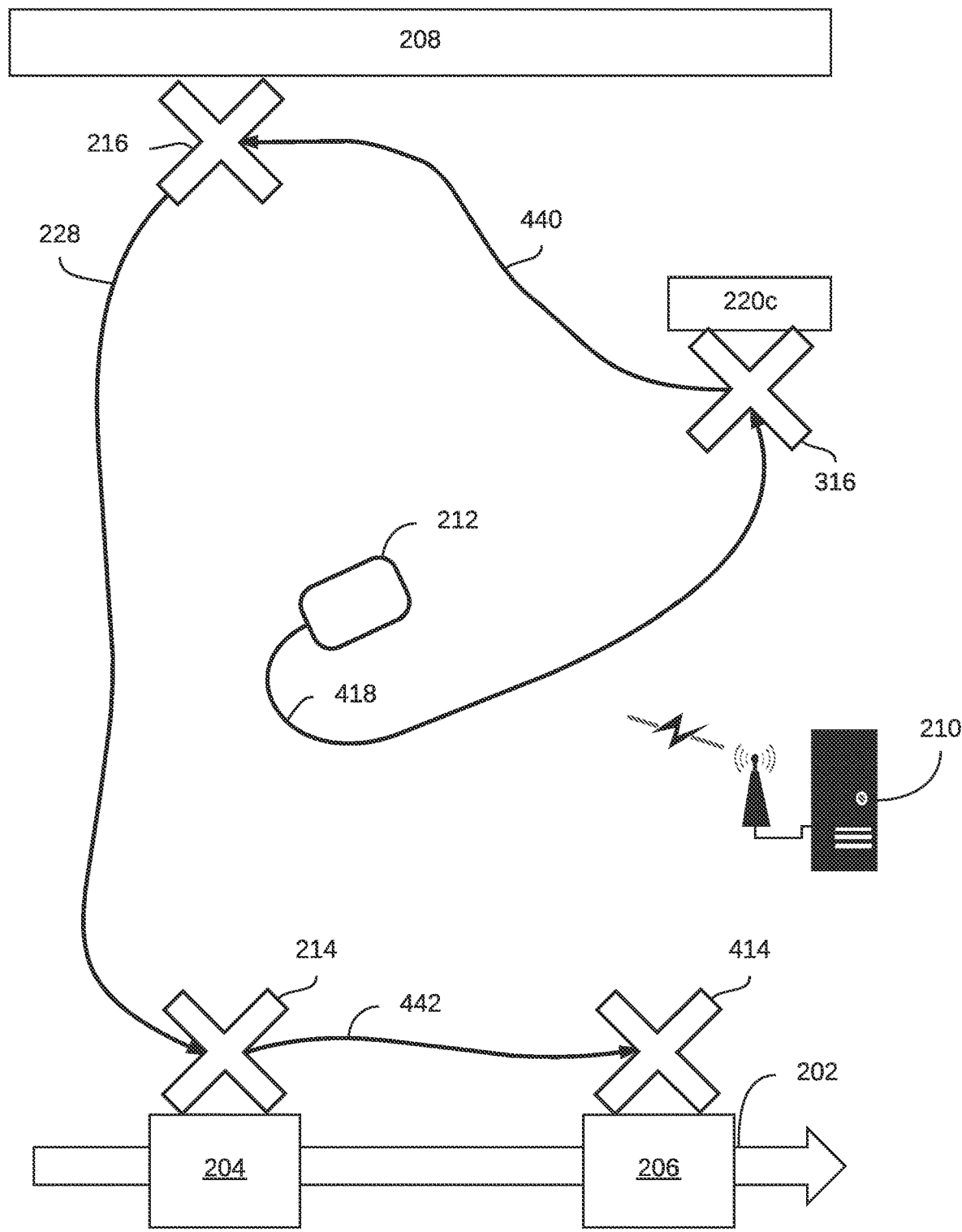
FIG. 4 is a plan view of a system for autonomous lineside delivery in a manufacturing facility according to some embodiments.

Referring to FIG. 4, there is shown the facility 200 according to some embodiments. The facility 200 is the same as shown in FIG. 3, except that only one vehicle 212 is depicted. FIG. 4 generally depicts an example in which one vehicle can be used to pick up two different parts, and drop each part off, respectively, at two different assembly-line locations. According to some embodiments, one vehicle may be used to pick up any number of different parts, and drop the parts off at any number of assembly-line locations.

In a similar manner as previously described, the vehicle 212 receives a mission from the fleet-management system 210. In the present example, the mission specifies that the vehicle is to pick up a first part for delivery to a first assembly-line location, and a second part for delivery to a second assembly-line location.

According to some embodiments, and as shown in the example of FIG. 4, when the fleet-management system 210 generates the mission (and, according to some embodiments, when the fleet-management system 210 is selecting a particular vehicle 212 from a fleet of vehicles), the fleet-management system 210 determines that the most efficient mission specifies that the second part should be picked up before the first part. For example, as shown, the second part is stored on the shelf 220c, and is to be delivered to the second assembly-line location 414 (e.g. for use in the assembly-line stage 206). The first part is stored on the shelf 208 (proximate the pick-up location 216), and is to be delivered to the first assembly-line location 214 (e.g. for use in the assembly-line stage 204).

According to some embodiments, the fleet-management system 210 may arrange the pick-up order and/or delivery order according to various criteria. For example, the fleet-management system 210 may arrange the pick-up order based on any or all of the location of the vehicle 212 (e.g. the location of the vehicle 212 at the time that the mission is being generated and/or the location of the vehicle 212 at the time that vehicle selection is being done), the traffic conditions in the facility 200 (e.g. including defined zones as previously described), and an estimate of travel times based on estimated or likely paths that the vehicle 212 may take.

According to some embodiments, the mission generated by the fleet-management system 210 may include the part identifiers and/or the pick-up locations, and the corresponding assembly-line locations for delivery, and the vehicle 212 may arrange the pick-up and/or delivery order.

According to some embodiments, the delivery order, and corresponding delivery times for each delivery are determined based on the takt time of the assembly process associated with the assembly line 202. In some cases, the fleet-management system 210 may estimate the travel time for the vehicle 212, and, based on the takt time and/or delivery times, may determine the necessary pick-up times at which the parts should be picked up in order to ensure that the parts are delivered prior to the delivery times. As such, a multi-pick-up and multi-delivery mission can be arranged based on the pick-up times and the relative location of the pick-up locations.

For example, if the deliver to the stage 206 is required at one takt-time period after the deliver to the stage 204, and it is unlikely that the vehicle 212 can travel from the assembly-line location 214 to the assembly-line location 414 within one takt-time period, then a determination can be made that either a single vehicle cannot be used to make both deliveries, or that the single vehicle must deliver a part to the stage 206 that corresponds to a different work product than the part that was delivered to the stage 204. In other words, a single vehicle 212 may deliver a first part to a first stage 204 corresponding to a first work item, and then proceed to deliver a second part to a second stage 206 corresponding to a second work item, if it has been determined that the first work item will already be through the stage 206 before the vehicle 212 can deliver the corresponding second part.

The fleet-management system 210 may select a particular vehicle 212 from a fleet of vehicles based on a comparison of the pick-up order and/or delivery order options available with other vehicles, and/or on a preferred pick-up and/or delivery order.

According to the mission, the vehicle 212 travels along a pick-up path 418 to the pick-up location 316, receives a part from the inventory shelf 220c.

According to some embodiments, the vehicle 212 may be fitted with a particular apparatus designed for receiving and carrying two parts for delivery to two different assembly-line locations. In this case, the vehicle 212 may plan it orientation relative to the pick-up location in order to ensure that the proper part is being received by the corresponding section of the apparatus. Referring to the example of FIG. 4, since the delivery order is known to be 214 first, and then 414 (i.e. the stage 204 requires the first part before the stage 206 requires the second part), then the apparatus on the vehicle 212 may be designed to receive the first part on the front section of the apparatus, and to receive the second part on the rear section of the apparatus. In other words, since a particular delivery sequence has been defined, it is may be important to maintain the same sequence of parts on the vehicle 212 itself. In this case, and according to the example, since the mission specifies that the second part is to be picked up at the shelf 220c before the first part is picked up at the shelf 208, the vehicle 212 may orient itself at the pick-up location 316 so that the second part is received so as to maintain the overall sequence. For example, if the second part is to be received on the rear section of the apparatus on the vehicle 212, then the vehicle 212 may reverse into the pick-up location 316, or pivot in the pick-up location 316 so that the rear section of the apparatus is presented to receive the second part.

After receiving the part from the shelf 220c, the vehicle 212 travels along another pick-up path 440 (which may be planned by the vehicle, as previously described) to another pick-up location 216. As previously described, in some embodiments, the vehicle 212 may orient itself at the pick-up location 216 in order to maintain a specific sequence of parts on the vehicle 212.

After receiving the part from the shelf 208, the vehicle 212 travels along a delivery path 228 as previously described, and delivers the part from the shelf 208 to the stage 204. Subsequently, the vehicle 212 travels along another delivery path 442 and delivers the part from the shelf 220c to the stage 206 of the assembly line 202.

In this way, autonomous lineside delivery can be used to provide more than one type of part to more than one stage of the assembly line 202 using a single vehicle 212, without any limitations of assigning a particular vehicle to a particular pick-up location, or a particular pick-up order. For example, in an automobile assembly line, the stage 204 may be the stage where front brakes are installed, and the stage 206 may be the stage where rear brakes are installed. The front brakes may be stored on the shelf 208, and the rear brakes may be stored on the shelf 220c. Thus, the fleet-management system 210 can be used (e.g. along with an enterprise resource planning system or other system) to provide the proper sequence of parts that are needed by a sequence of stages to produce a finished good. In the above example, an automobile may be assembled by providing a sequence of parts that corresponds to the sequence of stages in the assembly-line process. Furthermore, the storage location for the front brakes and/or the rear brakes could be changed at any given time in order to optimize the overall inventory storage strategy (or, as previously described, in order to increase the flexibility available for assigning delivery trucks to delivery-truck docks).

This is not possible, for example, using an automated guided vehicle ("AGV") that requires specific infrastructure such as a magnetic strip to be pre-determined between particular pick-up and drop-off locations, since the infrastructure must be pre-determined to connect a specific pick-up location with a specific drop-off location, and vehicle cannot deviate from the pre-determined path. Similarly, this is not possible with vehicles driven by human operators, since a particular manufacturing facility and/or inventory area may be too large for a human operator to sufficiently learn the location of every pick-up location and drop-off location in order to be efficient in delivering parts to intermediate stocking queues in a "just-in-time" manner, or to keep up-to-date with changes in pick-up locations.

Referring to FIG. 5 to FIG. 10, there are shown various methods related to autonomous lineside delivery. According to some embodiments, these methods may be stored as computer instructions stored on non-transitory computer-readable media on any or all of a self-driving material-transport vehicle, a fleet-management system, and an enterprise resource planning system. Each of the vehicle, fleet-management system, and enterprise resource planning system include at least one processor and memory such that the computer instructions can be used to configure the processors to execute any or all of the steps of the following methods. According to some embodiments, any or all of the methods 500, 600, 700, 800, 900, and 1000 may be run concurrently, sequentially, in parallel, or responsive to each other.

Figure 5:
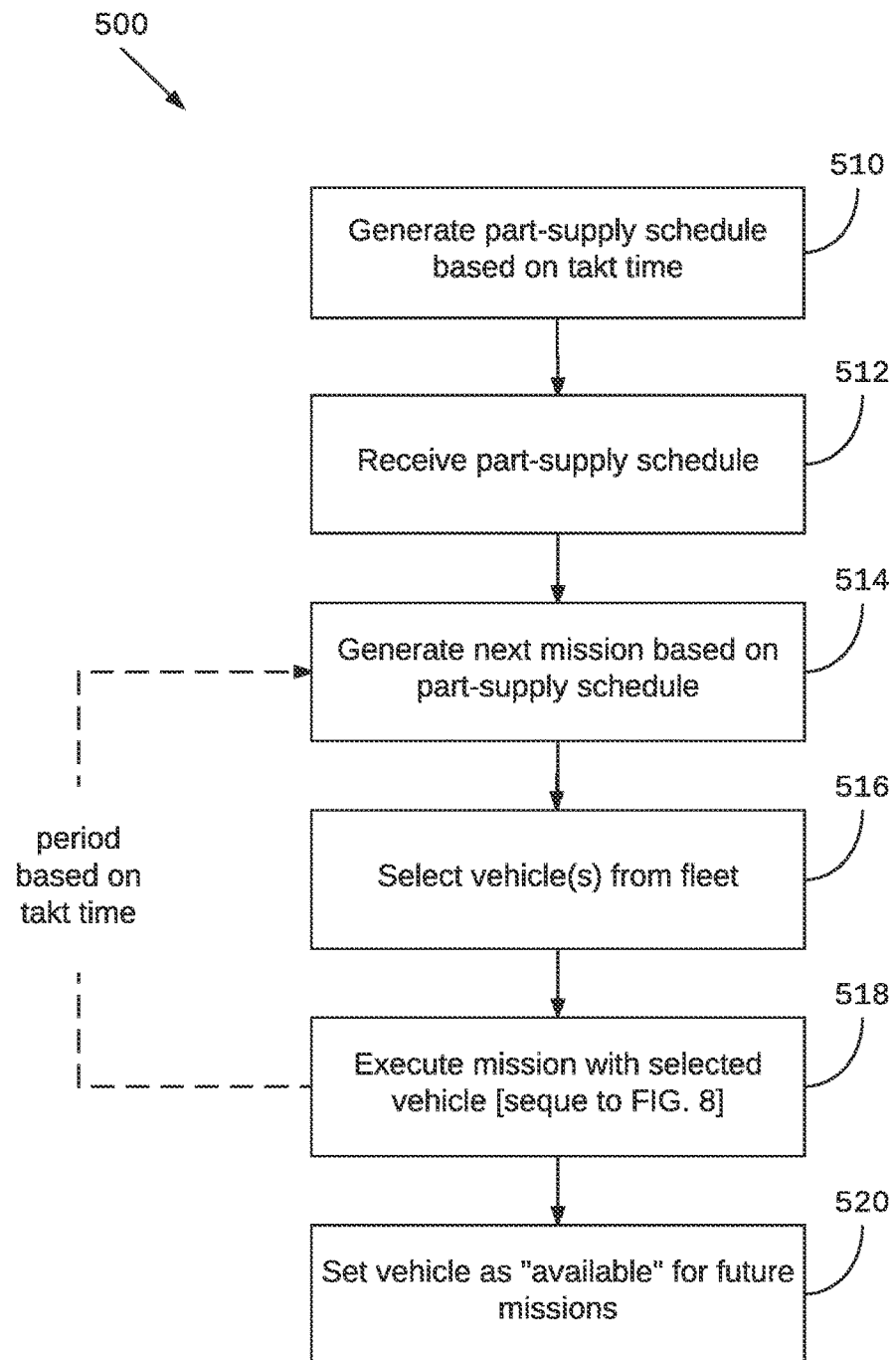
FIG. 5 is a flow diagram of a method for autonomous lineside delivery according to some embodiments.

Referring to FIG. 5, there is shown a method 500 for autonomous lineside delivery according to some embodiments.

The method begins at step 510, when a part-supply schedule is generated. According to some embodiments, the part-supply schedule is based on a takt time of an associated assembly-line process. As used here, a "part-supply schedule" need not necessarily be a strictly-defined schedule according to a pre-defined format. Rather, a "schedule" may simply be a request to pick up a particular part and deliver it to a particular assembly-line location (or assembly-line stage) by a particular time. According to some embodiments, the assembly-line schedule may be generated by an enterprise resource planning system, and/or a fleet-management system. According to some embodiment, the assembly-line schedule may be generated by a human operator, such as a person planning an assembly-line process. According to some embodiments, the assembly-line schedule may be generated by a human operator who pushes a button to request that more parts be delivered.

At step 412, the part-supply schedule is received. According to some embodiments, the part-supply schedule is received by a fleet-management system from an enterprise resource planning system.

At step 514, a mission is generated based on the part-supply schedule. The mission can be generated by the fleet-management system, though, in some embodiments, the mission can be generated and/or altered by a vehicle (e.g. a vehicle that is executing the mission). Generally, a mission is generated in order to specify a part to be picked up and delivered. According to some embodiments, the mission may include any or all of a part identifier, pick-up location, a part-storage location, an assembly-line location, an assembly-line stage, and a delivery time. According to some embodiments, the fleet-management system may also calculate or estimate travel times for a vehicle to pick up and delivery the parts according to the mission. These pick-up times may be included in the mission, and/or used in the creation of the mission and/or selection of a particular vehicle from a fleet of vehicles, for executing the mission. The pick-up times and estimated travel times may be determined based on the location of a vehicle (or multiple vehicles within a fleet), and various traffic conditions such as congestion (e.g. caused by other vehicles known to the fleet-management system), and zones that have been identified with known navigational considerations.

Figure 6:
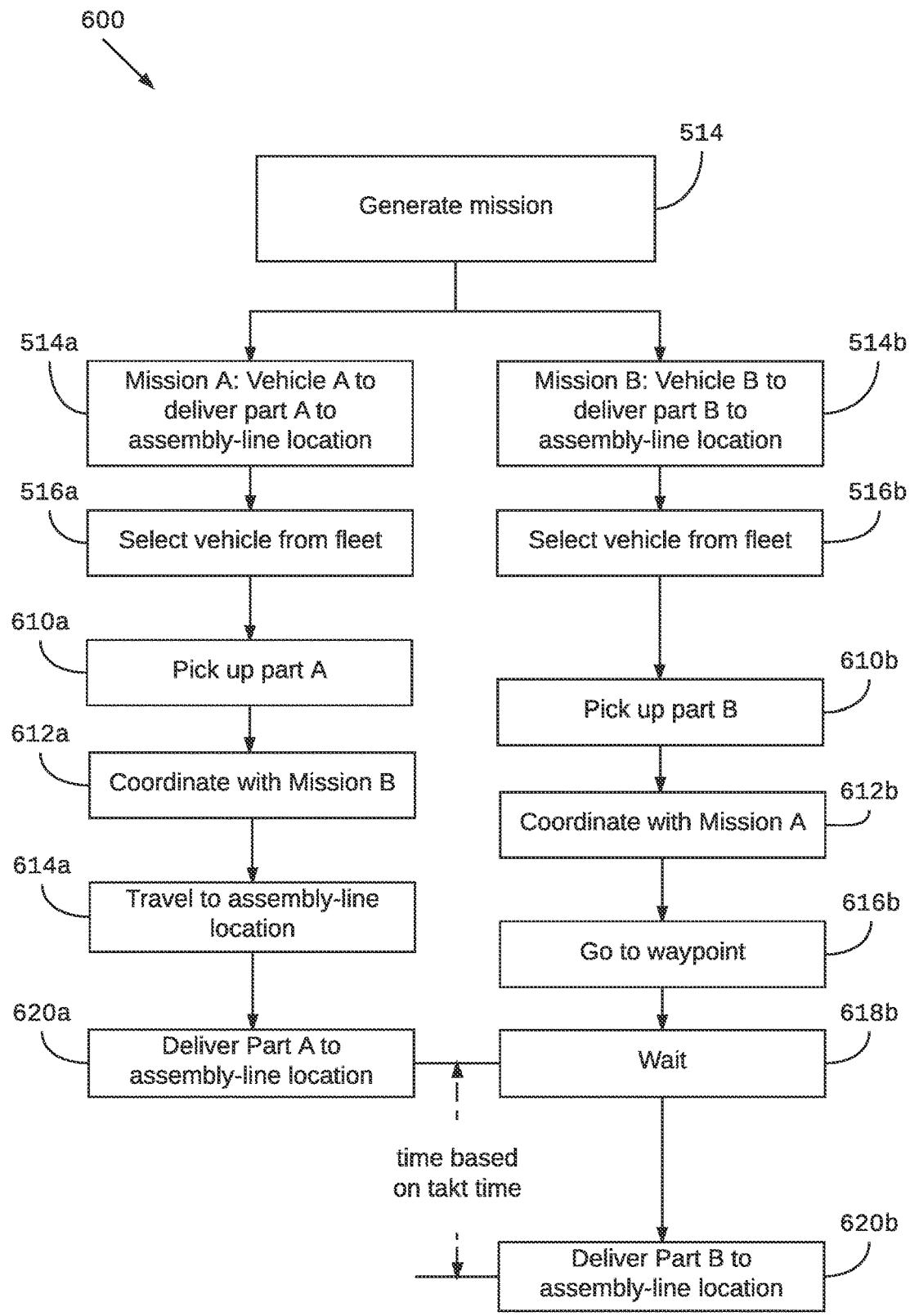
FIG. 6 is a flow diagram of a method for autonomous lineside delivery using two or more vehicles to deliver to the same assembly-line location according to some embodiments.
Figure 7:
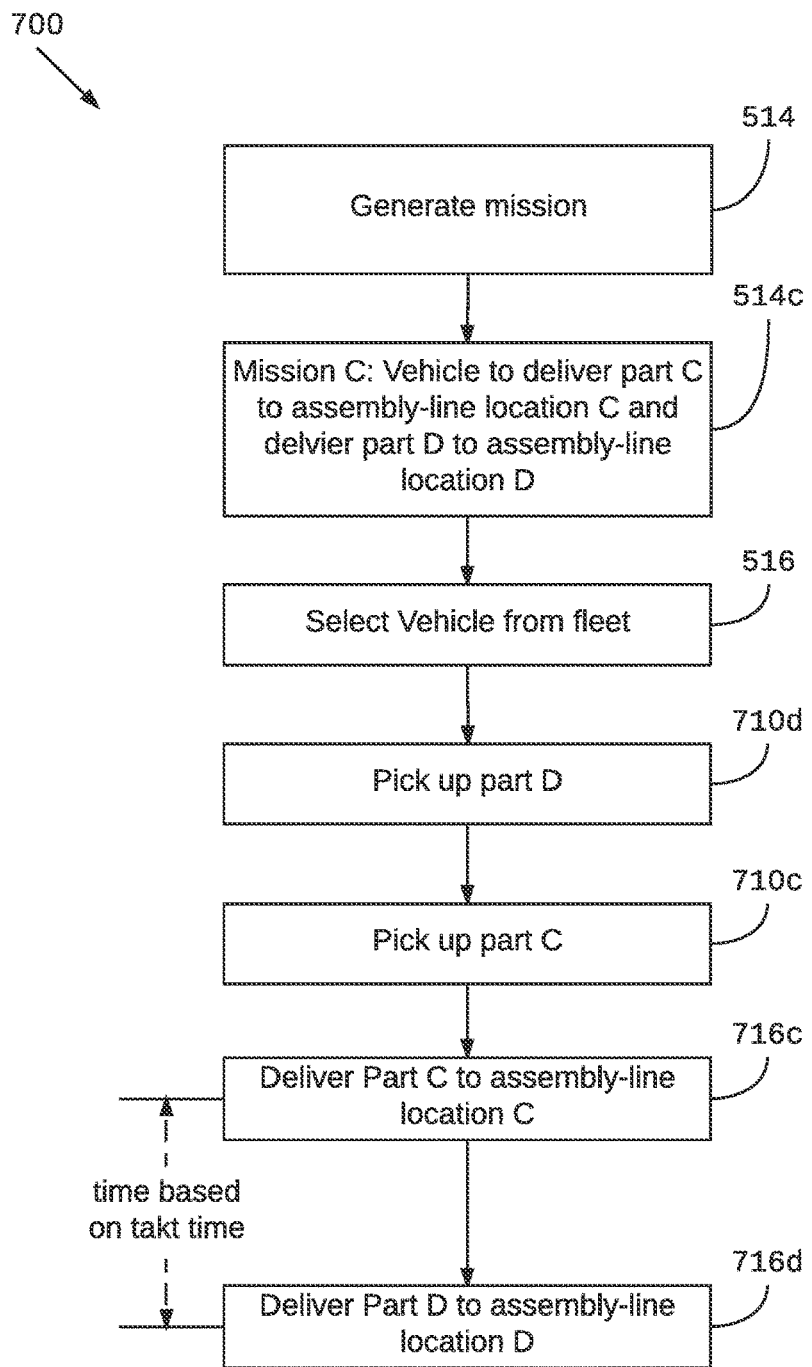
FIG. 7 is a flow diagram of a method for autonomous lineside delivery using one vehicle to deliver to two or more assembly-line locations according some embodiments.

Examples of methods for autonomous lineside delivery based on a mission (e.g. as generated at step 514) are shown in FIG. 6 and FIG. 7, which are described in more detail below.

At step 516, a particular vehicle may be selected to execute the mission, from among a fleet of vehicles. According to some embodiments, step 516 may be omitted, for example, if there is only one vehicle in the fleet, or if the assignment of a particular mission to a particular vehicle has been otherwise previously determined. According to some embodiments, vehicles may be selected based on location, current and planned missions, vehicle availability, and vehicle equipment (e.g. whether a particular vehicle is equipped with an apparatus to receive a particular type of part, or more than one part, as may be required for a mission).

At step 518, the selected vehicle executes the mission, which generally includes picking up the part(s) from the pick-up location(s) and delivering the part(s) to the assembly-line locations(s). Examples of mission execution are provided in FIG. 6, FIG. 7, and FIG. 8, and are further described below.

The dashed line in FIG. 5 is used to indicate that the method 500 can iterate through step 514, thereby generating subsequent missions (which may or may not be assigned to the same vehicle at step 516). According to some embodiments, missions may be generated for periodic delivery to assembly-line locations based on the takt time.

For example and illustration, if the method 500 is assumed to pertain to a single vehicle (such that the step 516 can be omitted or ignored), then each mission executed by the vehicle at step 518 is executed according to the takt time. In some cases, this may mean that subsequent missions are executed according to a multiple of the takt time (i.e. it is not necessary that a single vehicle be able to conduct an entire mission within one takt time period). However, in some cases, for each takt time period, there may be a vehicle executing a mission according to that takt time.

At step 520, after the vehicle has executed its mission, the vehicle is considered to be "available" for future missions. According to some embodiments, this may involve setting a status indicator associated with the vehicle to an "available" status, and reporting this status to the fleet-management system. According to some embodiments, missions may be generated at step 514 that involve multiple iterations or repetitions of the same mission tasks, such that the vehicle continues a series of repeated pick-ups and deliveries without becoming "available". According to some embodiments, a sequence of multiple missions may be generated for a single vehicle such that the entire sequence of missions is executed before the vehicle is considered to be "available".

Referring to FIG. 6, there is shown a method 600 for autonomous lineside delivery according to some embodiments. The method 600 depicts an example scenario in which two vehicles deliver two different parts to the same assembly-line location, for example, as related to FIG. 3. The nomenclature "a" and "b" in FIG. 6 generally refer to the first and second vehicles, respectively, and, according to some embodiments, only a single branch of the method 600 (i.e. either "a" or "b") may be executed (i.e. with a single vehicle and a single part). In some cases, the alignment of the steps in the "a" branch relative to the "b" branch is used to indicate time, though this is only for illustrative purposes and ease of explanation where appropriate.

The method 600 may begin when a mission is generated, for example, as in step 514 of the method 500. For the sake of illustration, FIG. 6 identifies two missions, "Mission A" and "Mission B", at steps 514a and 514b respectively. In some embodiments, these may represent two separate mission, each sent to one vehicles; whereas in other embodiments, these may represent two parts of the same mission that is sent to two vehicles. As such, according to some embodiments, the steps 514a and 514b are redundant to, or in place of step 514.

At step 514a, Mission A is generated, to be assigned to a first vehicle for delivering "part A" to an assembly-line location. At step 514, Mission B is generated, to be assigned to a second vehicle for delivering "part B" to the assembly-line location. According to the example in the method 600, part B is to be delivered to the assembly-line location by vehicle B after part A has been delivered to the assembly-line location by vehicle A.

At steps 516a and 516b, a first vehicle is selected from the fleet as "vehicle A", and a second vehicle is selected from the fleet as "vehicle B". According to some embodiments, when two or more vehicles are to be selected for two or more missions, respectively, then the selection may be done sequentially such that the first vehicle is selected from the fleet and then the second vehicle is selected from the fleet (wherein the fleet no longer includes the first vehicle). According to some embodiments, when two or more vehicles are to be selected for two or more missions, respectively, then the selection of both vehicles may be conducted as a single optimization of all generated missions across all vehicles in the fleet.

At step 610a, vehicle A plans and travels along a pick-up path to a pick-up location, and receives part A. At step 610b, the vehicle B plans and travels along a pick-up path to a pick-up location, and receives part B. As indicated by the placement of step 610b in FIG. 6, in the example provided, vehicle B picks up part B after vehicle A picks up part A.

At step 612a, vehicle A coordinates with Mission B. According to some embodiments, step 612a (and step 612b) can be carried out by the fleet-management system, the vehicle itself (i.e. vehicle A for step 612a), or a combination there. As depicted, step 612b is essentially the same as step 612a, except that, according to the example provided, step 612a yields a different result (and thus different subsequent steps) then step 612b. According to some embodiments, step 612a (and step 612b) may be conducted on an ongoing and repeated basis throughout the method after the steps 516a and 516b. A single step 612a (and 612b) is shown after the step 610a (and, respectively, 610b) for the sake of illustration.

At step 612a, according to the example shown, vehicle A and/or the fleet-management system determine that vehicle A should proceed to the assembly-line location since part A is to be delivered prior to part B. According to some embodiments, step 612a may also include coordinating with other missions (e.g. previously-scheduled missions being executed by other vehicles). According to some embodiments, mission coordination at step 612a (and step 612b) includes estimating the travel time for vehicle A to the assembly-line location, which may be based on the path planned by vehicle A and/or an estimated path known to the fleet-management system. The estimated travel time may be used to determine an estimated delivery time for vehicle A, and this estimated travel time can be shared with the fleet-management system (or directly with other vehicles in the fleet).

At step 612b, according to some embodiments, the vehicle B and/or the fleet-management system determines the estimated delivery time for vehicle B, as previously described for vehicle A. At step 612b, it is determined that vehicle B is likely to arrive at the assembly-line location before vehicle A (and/or before the scheduled delivery time for part A based on the takt time).

As a result of determining that vehicle B is likely to arrive at the assembly-line location earlier than vehicle A, the fleet-management system and/or vehicle B determine that vehicle B should be routed to a waypoint. At step 616b, vehicle B plans a path and travels to the waypoint. According to some embodiments, the waypoint may be adjacent the assembly-line location, or otherwise within a sufficient proximity to allow for a high degree of certainty in the time required for a vehicle to travel from the waypoint to the assembly-line location.

At step 614a, vehicle A plans a path and travels to the assembly-line location. At or around the same time, vehicle B travels to the waypoint during step 616b, and, upon vehicle B reaching the waypoint, the method proceeds to step 618b. At step 618b, vehicle B waits at the waypoint for a waiting period. According to some embodiments, the waiting period may be determined based on any or all of the estimated travel time from the waypoint to the assembly-line location, the delivery time for part A, the delivery time for part B, and the takt time.

At or around the same time that vehicle B is waiting at the waypoint during step 616b, vehicle A travels to the assembly-line location during step 614a and then delivers part A to the assembly-line location during step 620a. According to some embodiments, upon arrival at the assembly-line location, or delivery of part A, vehicle A may transmit a signal to the fleet-management system and/or vehicle B directly, which can serve as a trigger to indicate that vehicle B no longer has to wait at the waypoint.

After vehicle B has waited at the waypoint during step, vehicle B travels to the assembly-line location and delivers part B to the assembly-line location during step 620b.

As indicated by the dashed line in FIG. 6, according to some embodiments, the time between the scheduling or execution of step 620a and step 620b is based on the takt time.

Referring to FIG. 7, there is shown a method 700 for autonomous lineside delivery according to some embodiments. The method 700 depicts an example scenario in which one vehicle deliver two different parts to two different same assembly-line locations, for example, as related to FIG. 4. The nomenclature "c" and "d" in FIG. 7 generally refer to the first and second parts, respectively, and, according to some embodiments, some steps of the method 700 (i.e. either "c" or "d" steps) may be executed (i.e. with a single part).

The method 700 may begin when a mission is generated, for example, as in step 514 of the method 500. For the sake of illustration, FIG. 7 identifies one mission, "Mission C" at step 514c. In some embodiments, this mission may be represented as two separate mission, each sent to the vehicle. As such, according to some embodiments, the step 514c is redundant to, or in place of step 514.

At step 514c, Mission C is generated for delivering "part C" to assembly-line location C and for delivering "part D" to assembly-line location D. According to the example in the method 700, part C is to be delivered to the assembly-line location before part D, and part D is to be picked up before part C.

At steps 516, a vehicle is selected from a fleet of vehicles, as previously described.

Since the mission specifies that part D is to be picked up before part C, the example proceeds to step 710d. At step 710d, the vehicle plans and travels along a pick-up path to a pick-up location, and receives part D. Once part D has been received on the vehicle, then, at step 710c, the vehicle plans and travels along a pick-up path to a pick-up location, and receives part C.

According to some embodiments, steps 710d and/or 710c may include the vehicle orienting itself relative to a pick-up location or storage location so that a particular section of the vehicle (or an apparatus on the vehicle) can be presented for receiving the part. This may be particularly relevant in the example shown in FIG. 7. For example, since the assembly-line process may require a specific sequence for part C and part D, parts C and D can be arranged in the proper sequence (in space) on the vehicle even if they are picked up out of sequence (in time).

At step 716c, the vehicle plans and travels along a path to assembly-line location C, and delivers part C. Subsequently, at step 716d, the vehicle plans and travels along a path to assembly-line location D, and delivers part D.

As indicated by the dashed line in FIG. 7, according to some embodiments, the time between the scheduling or execution of step 616c and step 616d is based on the takt time.

Figure 8:
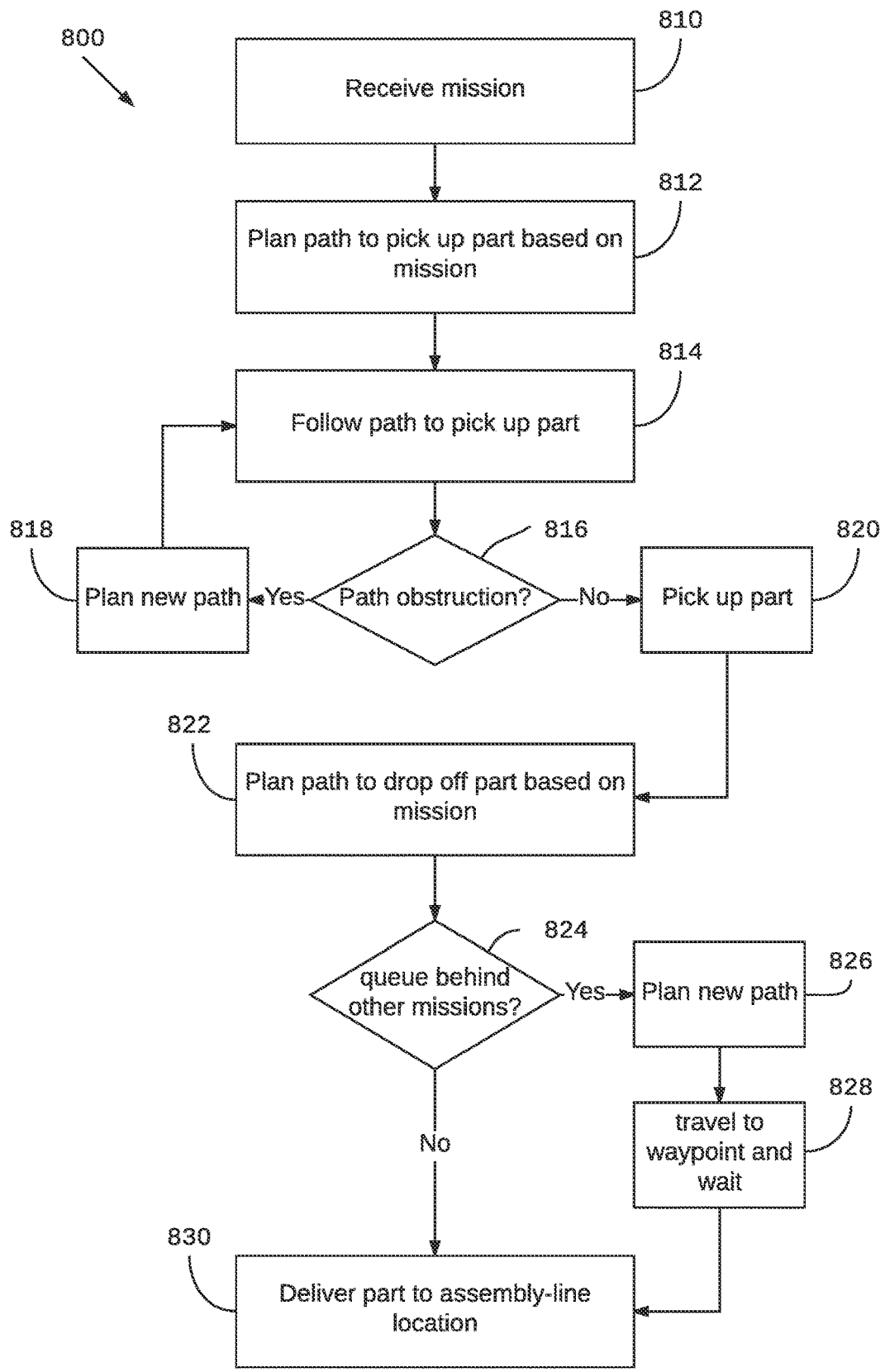
FIG. 8 is a flow diagram of a method for executing a mission with a self-driving vehicle for autonomous lineside delivery according to some embodiments.

Referring to FIG. 8, there is shown a method 800 for autonomous lineside delivery, according to some embodiments. The method 800 generally depicts the execution of a mission by a vehicle. For the sake of illustration, the method 800 is depicted for the case of a single vehicle picking up a single part and delivering it to a single assembly-line location.

The method 800 begins at step 810, when the vehicle receives a mission. According to some embodiments, the vehicle may receive the mission from a fleet-management system. According to some embodiments, the vehicle may alter the mission.

At step 812, the vehicle plans a pick-up path from its current location to a pick-up location specified in the mission. According to some embodiments, the vehicle is capable of planning its own path based on a map of the vehicle's location stored on a computer-readable medium of the vehicle, and by using information obtained from sensors on the vehicle.

At step 814, the vehicle travels along the pick-up path towards the pick-up location.

Step 816 is shown after step 814. According to some embodiments, step 816 may be executed continuously or repeatedly throughout the duration of the method 800, for example, whenever the vehicle is moving. As shown in FIG. 8, at step 816, the vehicle, through the use of its sensors, determines whether there is an obstruction along the planned pick-up path. For example, an object not present in the vehicle's map may be detected by the vehicle's sensors, such as a human pedestrian or another vehicle. If, at step 816, the vehicle detects an obstruction, then the method proceeds to step 818, and a new pick-up path is planned from the vehicle's location to the pick-up location in order to avoid the obstruction. If, at step 816, no obstruction is detected, the method proceeds to step 820.

At step 820, the vehicle proceeds to the pick-up location and receives the part according to the mission. According to some embodiments, the part may be received by using an apparatus mounted on the vehicle for picking up the part and loading it on the vehicle.

At step 822, the vehicle plans a drop-off path from the pick-up location to the assembly-line location, in a similar manner as was previously described for the pick-up path at step 814.

At step 824, the vehicle coordinates with other missions. According to some embodiments, this may be accomplished with the fleet-management system and/or the vehicle. For example, as previously described in relation to the method 600 (such as steps 612a and 612b), the delivery time for the vehicle may be coordinated with the missions (e.g. delivery times) of other vehicles. This may be relevant, for example, in relation to other missions being conducted in parallel (e.g. as in FIG. 6), or missions being conducted in serial (i.e. a vehicle travelling to an assembly-line location may have to wait for a vehicle making a previous delivery to leave the assembly-line location before proceeding with its delivery).

If, at step 824, it is determined that the mission should be queued behind other missions, the method proceeds to step 826. At step 826, the vehicle plans a new path to a waypoint. At step 828, the vehicle travels to the waypoint and then waits until is delivery is at the front of the queue.

If, at step 824, it is determined that the mission is not queued behind other missions (i.e. no further coordination is required), then the method proceeds to step 830.

At step 830, the vehicle delivers the part to the assembly-line location according to the mission. According to some embodiments, the part may be delivered by using an apparatus mounted on the vehicle for picking up the part and unloading it from the vehicle. According to some embodiments, this same apparatus may also be used to load the part on the vehicle.

Figure 9:
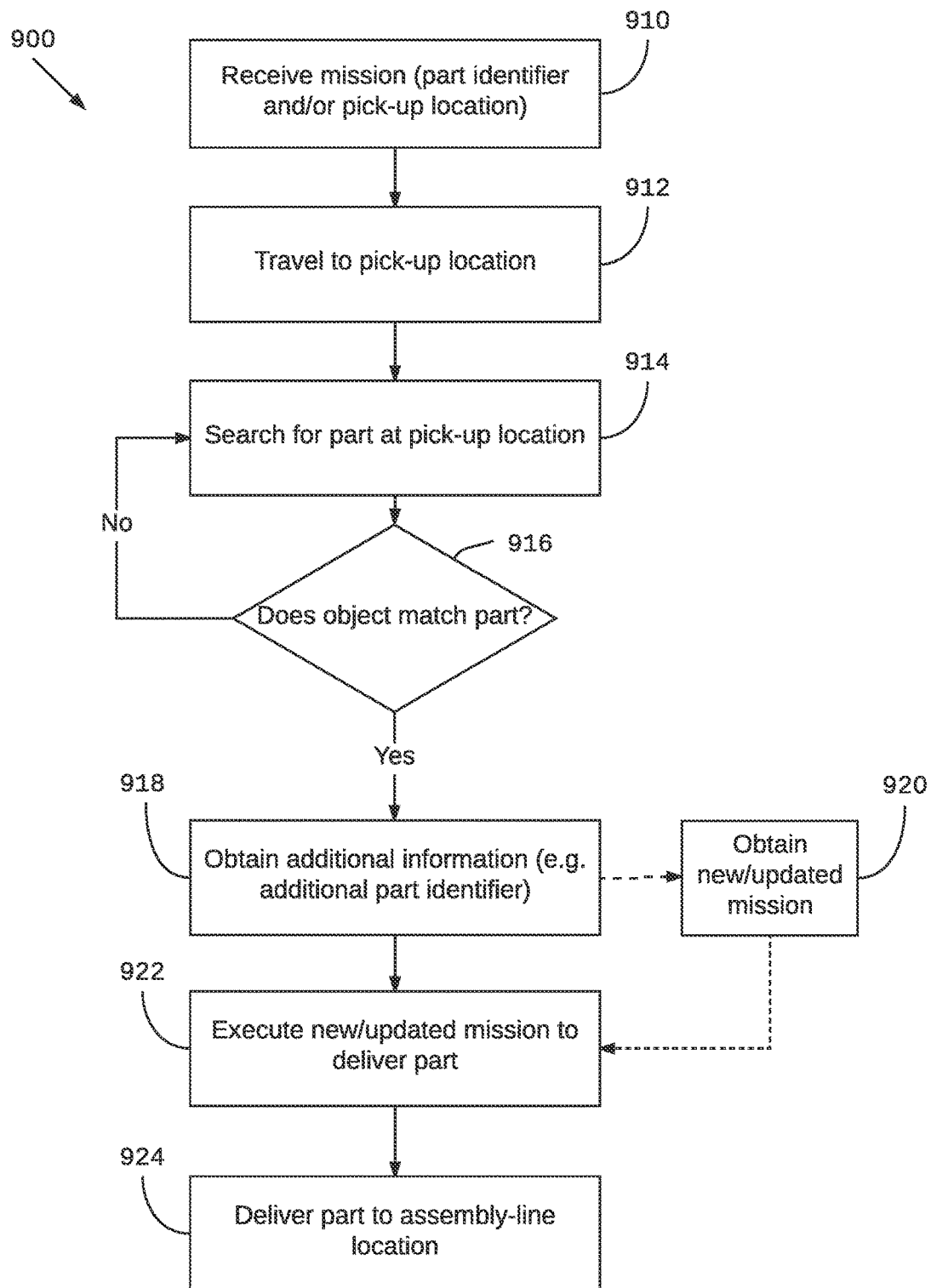
FIG. 9 is a flow diagram of a method for obtaining additional information from a part identifier for inclusion in a mission, according to some embodiments.

Referring to FIG. 9, there is shown a method 900 for autonomous lineside delivery according to some embodiments. The method 900 may be carried out by a self-driving vehicle, such as using the processor, memory, non-transitory computer-readable media, and computer instructions on the media that may be part of the vehicle's control system.

The method begins at step 910, when a mission is received by a self-driving vehicle. In particular, according to some embodiments, the mission may only include a part identifier and/or a pick-up location. For example, in some cases, only a part-identifier may be provided, and the vehicle may determine a corresponding pick-up location based on the part identifier. In some cases, the part identifier may identify a type of part, or fungible part, even though the vehicle will eventually be tasked with delivering a unique part.

At step 912, the vehicle travels to the pick-up location. According to some embodiments, the pick-up location may be, or may be associated with, a pick-up area, for example, defined as a proximity around a point.

At step 914, the vehicle, using its sensors, may search for a part at the pick-up location. According to some embodiments, the search may entail sensing various objects (e.g. parts) at the pick-up location, and then matching the various objects with a part identifier received during step 910. The vehicle may enter a "part-search" mode during steps 914 and 916.

According to some embodiments, searching for the part may including scanning identification tags attached to or associated with objects (such as other parts) in or around the pick-up location. For example, the vehicle may be equipped with scanners or readers for scanning or reading corresponding RFID, bar code, QR, etc. identification tags. According to some embodiments, the vehicle may use its optical sensors (e.g. cameras) to capture an image of an object and then compare the image to a known image of the part associated with the part identifier.

At step 916, the method considers whether the object scanned during step 914 matches the part that the vehicle is searching for (e.g. the part corresponding to the part identifier). If no match is found, the method returns to step 914, and the vehicle continues searching. If a match is found, then the method proceeds to step 918.

At step 918, the vehicle obtains addition information pertaining to the part. According to some embodiments, the vehicle may obtain the additional information directly from information tags (e.g. RFID, barcode, QR). According to some embodiments, the vehicle may determine the additional information from an image of the part captured by the vehicle.

According to some embodiments, the additional information may include any or all of an additional part identifier, an assembly-line location, and a delivery time. For example, the part identifier received during step 910 may indicate a party type, or a fungible part, such as an "engine". Thus, based on this information, the vehicle has travelled to pick up "an engine". Then, an additional part identifier is obtained that identifiers a unique part, such as a VIN on the engine. Based on the additional part identifier, the vehicle is able to determine the specific assembly-line location and/or delivery time for the unique part. In other words, the vehicle may be sent to pick up an engine, but it may not know which engine, specifically, it has picked up until after it obtains more information pertaining to the engine. In this way, the vehicle, either alone or with a fleet-management system and/or enterprise resource planning system, can alter the existing mission and/or generate a new mission and/or associate the information with the assembly task.

According to some embodiments, and as indicated by the dotted lines in FIG. 9, it may be necessary for the vehicle to communicate with a fleet-management system and/or enterprise resource planning system in order to obtain a new or updated mission based on the additional information. For example, if the additional information includes a VIN, then the vehicle may transmit the VIN to the fleet-management system in order to receive an update from the fleet-management system as to where and/or when the automobile with the corresponding VIN is planned to have its engine installed. According to some embodiments, the vehicle may be able to determine this new/updated mission itself, in which case, the method may omit step 920.

At step 922, the vehicle executes the new or updated mission in order to deliver the part according to the additional information. At step 924, the vehicle delivers the part to the required assembly-line location.

Figure 10:
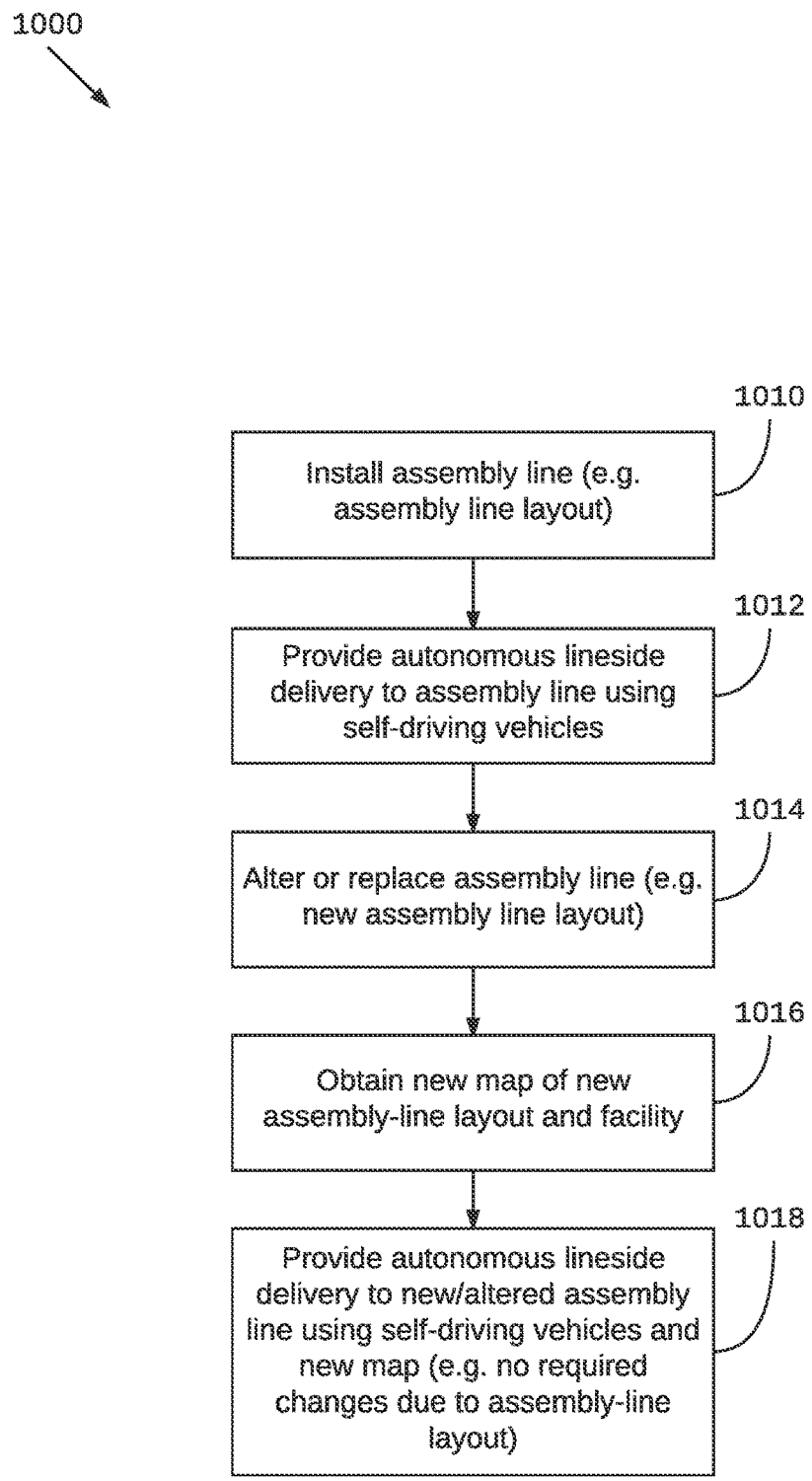
FIG. 10 is a flow diagram of a method for autonomous lineside delivery after changes to an assembly-line layout according to some embodiments.

Referring to FIG. 10, there is shown a method 1000 for autonomous lineside delivery according to some embodiments. The method 1000 depicts an example scenario in which the assembly-line infrastructure in a manufacturing facility is changed. For example, this may include moving the assembly line (or parts of the assembly line), relocating storage areas, and moving or otherwise reorganizing stages of the assembly line. This may be relevant, for example, when a manufacturing facility is intended to be used for the manufacture of a different part than was previously manufactured in the facility, and/or when upgrade tools and equipment are installed in the facility.

The method 1000 begins at step 1010 when infrastructure related to an assembly line is installed in the facility. For example, specific equipment and tools, storage locations, and an assembly line layout may be defined in order to produce a particular model of automotive.

At step 1012, autonomous lineside delivery is carried out in the facility using self-driving vehicles, for example, as previously described herein. According to some embodiments, a fleet-management system may also be used to provide the autonomous lineside delivery.

At step 1014, a new assembly line is installed. This may involve, for example, altering the assembly line installed during step 1010, or removing the assembly line installed during step 1010 and replacing it with a new one. It is assumed that, after step 1014, there is a new assembly line layout and facilities layout than during the step 1010.

At step 1016, a map is obtained that reflects the new assembly-line layout and/or facility layout. According to some embodiments, this new map may be an electronic map stored in the control system of a vehicle. According to some embodiments, the new map may be loaded on the fleet-management system and/or vehicle from a known map of the facility. According to some embodiments, the new map may be generated by a self-driving vehicle, using the sensors on a self-driving vehicle to capture information about the facility.

At step 1018, autonomous lineside delivery is carried out in the facility using the same self-driving vehicles and fleet-management system as was used during step 1012, with the new map that was obtained during step 1016. In other words, autonomous lineside delivery allows for changes to the facility and/or assembly-line layout to be implemented without causing any necessary changes to the self-driving vehicles or fleet-management system. For example, no physical changes to navigational infrastructure are required.

In particular, method 1000 can be implemented, according to some embodiments, so that no changes to the self-driving vehicles or fleet-management system are directly necessitated by a new assembly-line layout or facility layout. In some cases, changes may be implemented to the vehicles and/or fleet-management system contemporaneous to changes to the assembly-line. For example, a different fleet size (i.e. number of vehicles) may be more optimally suited to the assembly line installed during step 1014 as compared to the assembly line installed during step 1010. Furthermore, other changes such as the relocation of computer hardware for the fleet-management system may be implemented. However, these types of changes are considered insignificant and/or not caused directly by the changes to the assembly-line layout.

The present invention has been described here by way of example only. Various modification and variations may be made to these exemplary embodiments without departing from the spirit and scope of the invention, which is limited only by the appended claims.

We claim:

1. A method for autonomous lineside parts delivery to an assembly-line process, comprising:
    receiving a part-supply schedule comprising a part identifier identifying a part to be supplied to the assembly-line process;
    receiving one or more reference point locations, the one or more reference point locations identifying a location;
    in response to receiving the one or more reference point locations, automatically generating at least one mission comprising picking up the part from a pick-up location and delivering the part to a drop-off location, wherein the drop-off location is associated with the assembly-line process and at least one of the pick-up location or drop-off location is associated with the one or more reference point locations, wherein the pick-up location is associated with a reference point location of the one or more reference point locations, and the part-supply schedule further comprises an assembly-line location in the assembly-line process to be supplied with the part, and generating the at least one mission further comprises:
    selecting the pick-up location to be a location in proximity of the reference point location and accessible to the vehicle; and
    selecting the drop-off location to correspond to the assembly-line location;
    selecting a self-driving material-transport vehicle for executing the at least one mission;
    receiving the at least one mission at a vehicle processor on the vehicle; and
    executing the at least one mission with the vehicle to supply the part to the assembly-line process.

2. The method of claim 1, wherein at least one reference point location of the one or more reference point locations is received from a user.

3. The method of claim 1, wherein the reference point location associated with the pick-up location is one of a delivery-truck dock assigned to receiving the part or an inventory shelf location assigned for storing the part.

4. The method of claim 1, wherein a fleet-management system generates the at least one mission, selects the vehicle for executing the at least one mission, and transmits the at least one mission to the vehicle.

5. The method of claim 1, wherein executing the at least one mission by the vehicle comprises:
    controlling, by the vehicle processor, the self-driving vehicle to drive to the pick-up location to pick-up the part; and
    controlling, by the vehicle processor, the self-driving vehicle to drive to the assembly-line location to drop-off the part.

6. The method of claim 1, wherein the part-supply schedule further comprises a delivery time for supplying the part to the drop-off location, and wherein generating the at least one mission comprises generating the mission to deliver the part to the drop-off location by the delivery time, and wherein executing the at least one mission comprises supplying the part to the drop-off location in accordance with the delivery time in the part-supply schedule.

7. A method for autonomous lineside parts delivery to an assembly-line process, comprising:
    receiving a part-supply schedule comprising a part identifier identifying a part to be supplied to the assembly-line process;
    after receiving the part-supply schedule, waiting to receive the one or more reference point locations, the one or more reference point locations identifying a location;
    in response to receiving the one or more reference point locations, automatically generating at least one mission comprising picking-up the part from a pick-up location and delivering the part to a drop-off location, wherein the drop-off location is associated with the assembly-line process and at least one of the pick-up location or drop-off location is associated with the one or more reference point locations;
    selecting a self-driving material-transport vehicle for executing the at least one mission;
    receiving the at least one mission at a vehicle processor on the vehicle; and
    executing the at least one mission with the vehicle to supply the part to the assembly-line process.

8. The method of claim 7, wherein a fleet-management system generates the at least one mission, selects the vehicle for executing the at least one mission, and transmits the at least one mission to the vehicle.

9. The method of claim 7, wherein executing the at least one mission by the vehicle comprises:
    controlling, by the vehicle processor, the self-driving vehicle to drive to the pick-up location to pick-up the part; and
    controlling, by the vehicle processor, the self-driving vehicle to drive to the assembly-line location to drop-off the part.

10. The method of claim 9, wherein picking-up the part at the pick-up location further comprises:
    scanning an area around the pick-up location, via one or more sensors coupled to the vehicle processor, to automatically locate the part identified in the part-supply schedule; and
    in response to failing to locate the part:

detecting, via the one or more sensors, a visual indicia located on an object that is placed in proximity of the one or more sensors;

identifying, by the vehicle processor, a part identifier associated with the visual indicia;

determining that the part identifier matches the part identifier in the part-supply schedule; and receiving the object on the vehicle.

11. The method of claim 9, wherein the self-driving vehicle is located in an environment, and the method further comprises:

receiving an identification of a designated zone within the environment having one or more associated traffic conditions; and determining a vehicle path in the environment, between the pick-up location and the assembly-line location, that accommodates the one or more associated traffic conditions in the designated zone.

12. The method of claim 7, wherein the part-supply schedule further comprises a delivery time for supplying the part to the drop-off location, and wherein generating the at least one mission comprises generating the mission to deliver the part to the drop-off location by the delivery time, and wherein executing the at least one mission comprises supplying the part to the drop-off location in accordance with the delivery time in the part-supply schedule.

13. The method of claim 7, wherein at least one reference point location of the one or more reference point locations is received from a user.

14. A system for lineside parts delivery to an assembly-line process, comprising:

a fleet-management system having a fleet-management processor configured to:

receive a part-supply schedule comprising a part identifier identifying a part to be supplied to the assembly-line process;

after receiving the part-supply schedule, wait to receive the one or more reference point locations, the one or more reference point locations identifying a location;

in response to receiving the one or more reference point locations, automatically generate at least one mission comprising picking-up the part from a pick-up location and delivering the part to a drop-off location, wherein the drop-off location is associated with the assembly-line process and at least one of the pick-up location or drop-off location is associated with the one or more reference point locations;

select a self-driving material-transport vehicle for executing the at least one mission; and transmit the at least one mission to the vehicle; and the self-driving vehicle having a vehicle processor configured to:

receive the mission; and execute the at least one mission to supply the part to the assembly-line process.

15. The system of claim 14, wherein at least one reference point location of the one or more reference point locations is received by the fleet-management processor from a user.

16. The system of claim 14, wherein the pick-up location is associated with a reference point location of the one or more reference point locations, and the part-supply schedule further comprises an assembly-line location in the assembly-line process to be supplied with the part, and in generating the at least one mission, the fleet-management processor is further configured to:

select the pick-up location to be a location in proximity of the reference point location and accessible to the vehicle; and select the drop-off location to correspond to the assembly-line location.

17. The system of claim 16, wherein the reference point location associated with the pick-up location is one of a delivery-truck dock assigned to receiving the part, or an inventory shelf location assigned for storing the part.

18. The system of claim 14, wherein executing the at least one mission comprises the vehicle processor being further configured to:

control the self-driving vehicle to drive to the pick-up location to pick-up the part; and control the self-driving vehicle to drive to the assembly-line location to drop-off the part.

19. The system of claim 18, wherein the vehicle further comprises one or more sensors coupled to the vehicle processor, and at the pick-up location the vehicle processor is further configured to:

scan an area around the pick-up location, via the one or more sensors, to automatically locate the part identified in the part-supply schedule; and in response to failing to locate the part:

detect, via the one or more sensors, a visual indicia located on an object that is placed in proximity of the one or more sensors;

identify a part identifier associated with the visual indicia; and determine that the part identifier matches the part identifier in the part-supply schedule.

20. The system of claim 18, wherein the self-driving vehicle is located in an environment, and the fleet-management processor is further configured to:

receive an identification of a designated zone within the environment having one or more associated traffic conditions; and determine a vehicle path in the environment, between the pick-up location and the assembly-line location, that accommodates the one or more associated traffic conditions in the designated zone; and generate the at least one mission to include the vehicle path; and the vehicle processor is further configured to:

execute the at least one mission by controlling the vehicle to follow the vehicle path.

* * * * *

UNITED STATES PATENT AND TRADEMARK OFFICE
CERTIFICATE OF CORRECTION

Page 1 of 1

PATENT NO. : 11,842,315 B2
APPLICATION NO. : 17/212922
DATED : December 12, 2023
INVENTOR(S) : Ryan Christopher Gariepy et al.

It is certified that error appears in the above-identified patent and that said Letters Patent is hereby corrected as shown below:

On the Title Page

Item (56) in the References Cited, Page 2, Column 2, Line 59:
--2021/0385012-- should be --2021/0395012--

Signed and Sealed this
Fifth Day of March, 2024

Katherine Kelly Vidal
*Director of the United States Patent and Trademark Office*